United States Patent
Mukherjee et al.

(10) Patent No.: US 11,151,055 B2
(45) Date of Patent: Oct. 19, 2021

(54) LOGGING PAGES ACCESSED FROM I/O DEVICES

(71) Applicant: Google LLC, Mountain View, CA (US)

(72) Inventors: Shrijeet Subhabrata Mukherjee, San Carlos, CA (US); Prashant Chandra, San Jose, CA (US); David Alan Dillow, San Jose, CA (US); Joseph Raymond Michael Zbiciak, San Jose, CA (US); Horacio Andres Lagar Cavilla, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/551,452

(22) Filed: Aug. 26, 2019

(65) Prior Publication Data

US 2020/0356493 A1    Nov. 12, 2020

Related U.S. Application Data

(60) Provisional application No. 62/846,377, filed on May 10, 2019.

(51) Int. Cl.
  *G06F 12/10* (2016.01)
  *G06F 12/1081* (2016.01)
  (Continued)

(52) U.S. Cl.
  CPC ...... *G06F 12/1081* (2013.01); *G06F 9/45558* (2013.01); *G06F 11/3037* (2013.01);
  (Continued)

(58) Field of Classification Search
  CPC ............. G06F 12/1009; G06F 12/1081; G06F 12/109; G06F 2009/45583; G06F 9/45558; G06F 11/3037
  (Continued)

(56) References Cited

U.S. PATENT DOCUMENTS 9,201,612 B1   12/2015   Vincent
9,436,751 B1 *  9/2016   Serebrin ............. G06F 9/45558
(Continued)

FOREIGN PATENT DOCUMENTS

CN       102981962 A     3/2013
WO       2018176359 A1  10/2018

OTHER PUBLICATIONS

International Search Report and Written Opinion for International Application No. PCT/US2019/064216 dated Mar. 5, 2020. 16 pages.

*Primary Examiner* — Hua J Song
(74) *Attorney, Agent, or Firm* — Lerner, David, Littenberg, Krumholz & Mentlik, LLP

(57) ABSTRACT

Systems and methods of tracking page state changes are provided. An input/output is communicatively coupled to a host having a memory. The I/O device receives a command from the host to monitor page state changes in a region of the memory allocated to a process. The I/O device, bypassing a CPU of the host, modifies data stored in the region based on a request, for example, received from a client device via a computer network. The I/O device records the modification to a bitmap by setting a bit in the bitmap that corresponds to a location of the data in the memory. The I/O device transfers contents of the bitmap to the CPU, wherein the CPU completes the live migration by copying sections of the first region indicated by the bitmap to a second region of memory. In some implementations, the process can be a virtual machine, a user space application, or a container.

20 Claims, 12 Drawing Sheets

(51) Int. Cl.
*G06F 12/1009* (2016.01)
*G06F 12/109* (2016.01)
*G06F 9/455* (2018.01)
*G06F 11/30* (2006.01)

(52) U.S. Cl.
CPC ........ *G06F 12/1009* (2013.01); *G06F 12/109* (2013.01); *G06F 2009/45583* (2013.01)

(58) Field of Classification Search
USPC ........................................................ 711/206
See application file for complete search history.

(56) References Cited

U.S. PATENT DOCUMENTS

| | | | |
|---|---|---|---|
| 9,904,567 B2* | 2/2018 | Tsirkin | G06F 9/45558 |
| 2017/0199818 A1* | 7/2017 | Lomet | G06F 12/1009 |
| 2018/0024854 A1* | 1/2018 | Wang | G06F 9/5088 |
| | | | 718/1 |
| 2018/0246751 A1* | 8/2018 | Dong | G06F 9/505 |

\* cited by examiner

LOGGING PAGES ACCESSED FROM I/O DEVICES

RELATED APPLICATIONS

The present application claims the benefit of and priority to U.S. Provisional Patent Application No. 62/846,377, tilted "LOGGING PAGES ACCESSED FROM I/O DEVICES," and filed on May 10, 2019, the entire contents of which are hereby incorporated by reference for all purposes.

BACKGROUND

Modern data centers include hosts that can execute processes such as virtual machines (VMs), user space applications, and/or containers. The host allocates memory to each process. The host may wish to track and log pages accessed from I/O devices associated with the host. In some cases, however, the host may lack visibility over changes to the memory allocated to a process made by devices external to the host.

SUMMARY

At least one aspect is directed to a method of method of tracking page state changes. The method includes receiving, at an input/output (I/O) device communicatively coupled to a host having a physical memory, a command from the host to monitor page state changes in a first region of the physical memory allocated to a process executing on the host. The method includes modifying, by the I/O device, data stored in the first region based on a request. The method includes recording, by the I/O device, the modification to a bitmap by setting a bit in the bitmap that corresponds to a location of the data in the physical memory. The method includes copying, from the I/O device or the host, sections of the first region indicated by the bitmap to a second region of physical memory. The second region of physical memory can be in the physical memory of the host, or in a second physical memory of a second host.

In some implementations, the request includes an I/O virtual address indicating a location of the data in a virtual memory of the process, and modifying the data includes translating the I/O virtual address to obtain a host physical address indicating a location of the data in the physical memory.

In some implementations, translating the I/O virtual address comprises looking up the I/O virtual address in a local cache of the I/O device; and based on a determination that no entry for the I/O virtual address is found in the local cache, retrieving a translation of the address from the host, adding an entry for the I/O virtual address to the local cache, and adding and entry for the I/O virtual address to an access log queue of the I/O device, wherein: recording the modifications to the bitmap comprises setting bits according to the entries in the access log queue.

In some implementations, recording the modification comprises detecting, using a live migration engine of the I/O device, the request, wherein the request is received from a client device; based on finding an entry for the I/O virtual address of the request in a lookup table of the live migration engine, calculating a bitmap position based on a host physical address in the entry; and queuing a bitmap write address based on the bitmap position for recording to the bitmap.

In some implementations, the lookup table records two entries for each detected request: a first entry with a wide spacing and a second entry with a tight spacing, and wherein live migration engine calculates the bitmap position and queues the bitmap write address based on the second entry.

In some implementations, the bitmap is stored in an I/O device memory and transferring the contents of the bitmap to the host comprises, for each bit of the bitmap: reading the bit; preparing to copy a physical memory region corresponding to the bit location; and clearing the bit.

In some implementations, transferring the contents of the bitmap to the host comprises, for each bit of the bitmap: storing, by the I/O device, the bit in a first buffer in a general purpose memory of the host; completing, by the I/O device subject to receiving an instruction from the host to initiate a migration pass, pending bitmap updates; swapping, by the host, the first buffer with a second buffer; and copying, by the host, sections of the first region indicated by the bitmap in the first buffer.

In some implementations, the bitmap is stored in a general purpose memory of the host and transferring the contents of the bitmap to the host comprises, for each bit of the bitmap: reading, by the host, the bit; preparing, by the host, to copy a physical memory region corresponding to the bit location; and clearing, by the host, the bit.

In some implementations, recording the modification to a bitmap comprises: writing multiple bits to the bitmap with a single write operation.

In some implementations, the request includes an I/O virtual address indicating a location of the data in a virtual memory of the process; and recording the modification is performed subject to a determination that the I/O virtual address falls within a predetermined range of I/O virtual addresses designated for monitoring and migrating.

In some implementations, the process is one of a virtual machine, a user space application, or a container.

At least one aspect is directed to a system for tracking page state changes. The system includes a host having a physical memory and a CPU executing a process, and an input/output (I/O) device communicatively coupled to the host. The I/O device is configured to receive a command from the host to monitor page state changes in a first region of the physical memory allocated to the process, modify data stored in the first region based on a request, and record the modification to a bitmap by setting a bit in the bitmap that corresponds to a location of the data in the physical memory. The I/O device or the host is configured to copy sections of the first region indicated by the bitmap to a second region of physical memory, wherein the second region of physical memory can be in the physical memory of the host, or in a second physical memory of a second host.

In some implementations, the request includes an I/O virtual address indicating a location of the data in a virtual memory of the process, and the I/O device modifies the data by translating the I/O virtual address to obtain a host physical address indicating a location of the data in the physical memory.

In some implementations, the I/O device translates the I/O virtual address by: looking up the I/O virtual address in a local cache of the I/O device; and based on a determination that no entry for the I/O virtual address is found in the local cache, retrieving a translation of the address from the host, adding an entry for the I/O virtual address to the local cache, and adding and entry for the I/O virtual address to an access log queue of the I/O device, wherein: recording the modifications to the bitmap comprises setting bits according to the entries in the access log queue.

In some implementations, wherein the I/O device includes a live migration engine configured to record the modification by: detecting the request, wherein the request is received from a client device; based on finding an entry for the I/O virtual address of the request in a lookup table of the live migration engine, calculating a bitmap position based on a host physical address in the entry; and queuing a bitmap write address based on the bitmap position for recording to the bitmap.

In some implementations, the lookup table is configured to record two entries for each detected request: a first entry with a wide spacing and a second entry with a tight spacing, and wherein live migration engine calculates the bitmap position and queues the bitmap write address based on the second entry.

In some implementations, the I/O device is configured to store the bitmap in an I/O device memory, and the system is configured to transfer the contents of the bitmap to the host by, for each bit of the bitmap: reading the bit; preparing to copy a physical memory region corresponding to the bit location; and clearing the bit.

In some implementations, the host includes a general purpose memory having a first buffer and a second buffer, and the system is configured to transfer the contents of the bitmap to the host by, for each bit of the bitmap: storing, by the I/O device, the bit in a first buffer in a general purpose memory of the host; completing, by the I/O device subject to receiving an instruction from the host to initiate a migration pass, pending bitmap updates; swapping, by the host, the first buffer with a second buffer; and copying, by the host, sections of the first region indicated by the bitmap in the first buffer.

In some implementations, the host includes a general purpose memory configured to store the bitmap, and the system is configured to transfer the contents of the bitmap to the host by, for each bit of the bitmap: reading, by the host, the bit; preparing, by the host, to copy a physical memory region corresponding to the bit location; and clearing, by the host, the bit.

In some implementations, the I/O device is configured to record the modification to a bitmap by: writing multiple bits to the bitmap with a single write operation.

In some implementations, the request includes an I/O virtual address indicating a location of the data in a virtual memory of the process; and recording the modification is performed subject to a determination that the I/O virtual address falls within a predetermined range of I/O virtual addresses designated for monitoring and migrating.

In some implementations, the process is one of a virtual machine, a user space application, or a container.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
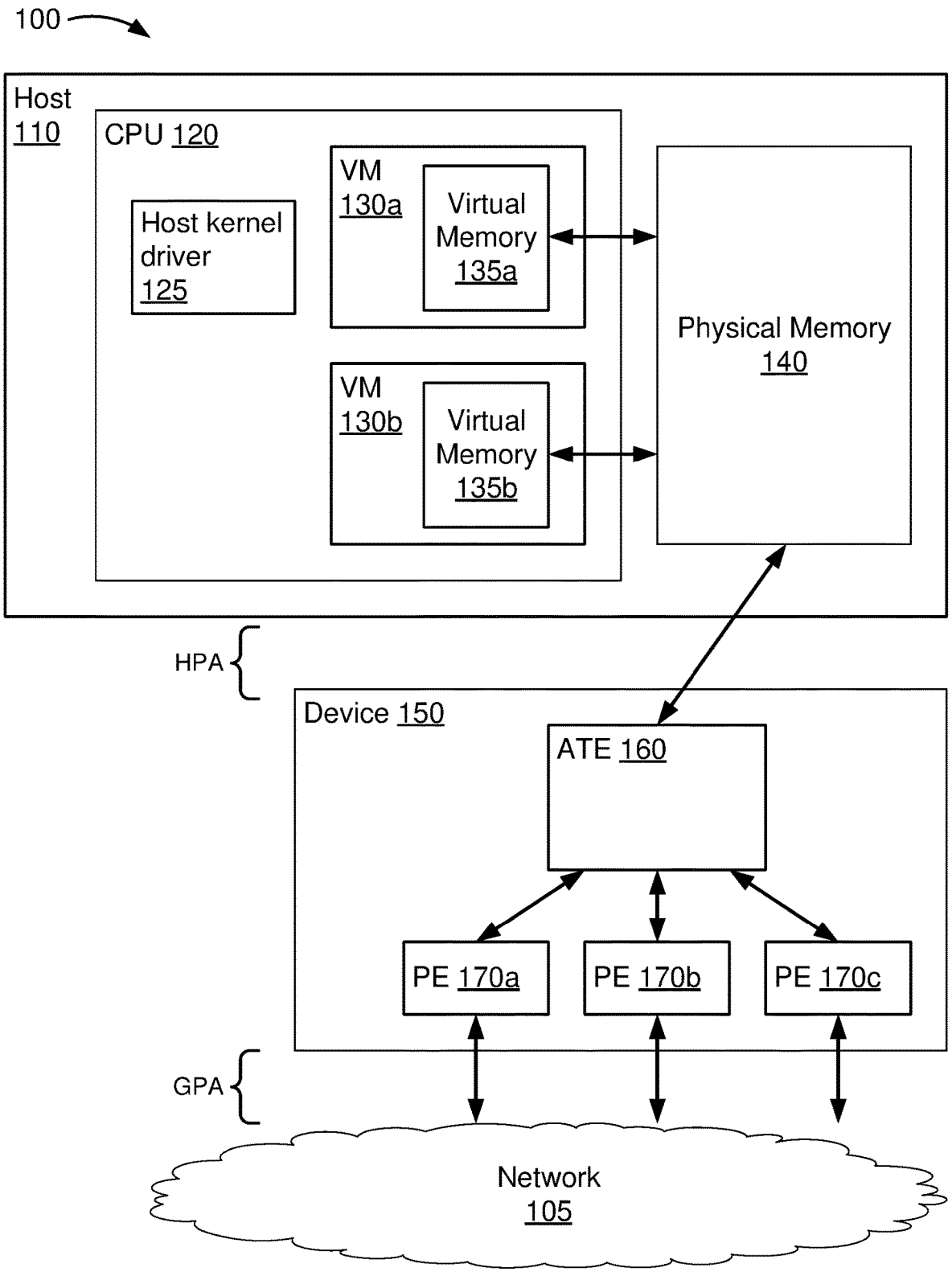
FIG. 1 is a block diagram of an example network environment with a host and an I/O device.

This disclosure relates generally to systems and methods of tracking page state changes in host memory regions allocated to a process such as a virtual machine (VM), user space application, container, etc. Modern data centers include a plurality of servers or hosts that can execute processes such as applications, which may run inside, or consist of containers or VMs. The host allocates each process a region or regions of physical memory. Situations may arise in which it may be desirable to monitor page state changes. For example, when the host needs to migrate a VM, the host will copy page states—i.e., the data contained within a page of memory—from a memory region currently allocated to the VM (source memory region), to a newly allocated memory region (destination memory region). During a live migration, the VM will remain online or active such that it can continue to serve clients during some or most of the duration of the migration. Performing such services may result in page state changes. The modified regions of memory represent "dirty bits." To complete the VM migration, the dirty bits should be copied to the destination memory region; that is, the system should update the destination memory region based on some or all of the page state changes that occurred during the migration. For accesses that are made from the host CPU, the host can use page access control to monitor access to pages in memory. For accesses made directly from an I/O device, however, the I/O device may bypass page state tracking logic of the host CPU; thus, the host may lack visibility into page state changes. What is needed is a scheme for monitoring and recording page state changes that occur during a live migration and result from operations that bypass the page state tracking logic of the host CPU, and in a manner that can keep pace with the high volume and high speed of memory accesses occurring in a server environment. This disclosure presents several such schemes.

Tracking pages that have been touched by I/O during, for example, a live migration, and preparing the final post copy phase of a live migration after a VM has been frozen, presents several challenges. Getting the list of pages touched is difficult because the host CPU may not see when the I/O device writes to memory. Moreover, making the list of pages touched dense is also difficult.

Two additional complications add to the challenges: page sizing and sparse space. First, for purposes of being efficient with memory management unit (MMU) and translation lookaside buffer (TLB) management, modern systems with significant amounts of memory tend to use page mappings larger than 4 KB (typically 2 MB). If the I/O device modifies a few bytes of a 2 MB page, under normal circumstances migration would require transferring 2 MB of data. To reduce the amount of data to transfer, the 2 MB pages could be subdivided into 4 KB chunks; and, by identifying the 4 KB pages that were touched, you can minimize the transfer overhead. In some implementations, the systems and methods of this disclosure can use any granularity smaller than the host systems page size. The result of tracking smaller granularity, however, is an increase in the amount of information required to monitor page state changes.

Second, I/O buffers can be assigned from anywhere in the memory allocated to the VM; and thus in the post copy phase, one would need to examine all addresses in the allocated memory, find the pages that have been touched, and copy them selectively. This sparse mode means that the computational requirements to perform linear searches across the entire VM memory allocation will increase linearly with memory size, and thus scale poorly.

This disclosure therefore provides several schemes for monitoring and recording pages state changes during live migration of processes that overcome such challenges to varying degrees.

FIG. 1 is a block diagram of an example network environment 100 with a host 110 and an I/O device 150 handing requests received over a network 105. The host 110 can be, for example, a server in a data center. The device 150 can be a network device such as a network interface card that handles network requests, received over the network 105, directed to the host. The network 105 is a network facilitating interactions between participant devices. An illustrative example network 105 is the Internet; however, in other implementations, the network 105 may be another network, such as a local network within a data center, a network fabric, or any other local area or wide area network. The network 105 may be composed of multiple connected subnetworks or autonomous networks. The network 105 can be a local-area network (LAN), such as a company intranet, a metropolitan area network (MAN), a wide area network (WAN), an inter-network such as the Internet, or a peer-to-peer network; for example, an ad hoc WiFi peer-to-peer network. Any type and/or form of data network and/or communication network can be used for the network 105. It can be public, private, or a combination of public and private networks. In general, the network 105 is used to convey information between computing devices; for example, to and from the host 110 via the device 150.

The host 110 is a host device or server executing one or more processes, such as virtual machines (VMs) 130a and 130b (generally virtual machines 130) on one or more CPUs 120 of the host 110. In some implementations, the processes can be containers or user space applications. The CPU 120 can also execute a driver 125. In some implementations, the driver 125 can be a hypervisor, which is an application that can spin up and spin down VMs 130, migrate VMs 130 to different CPUs 120 or hosts 110, and allocate and reallocate physical memory 140 regions to each VM 130. In some implementations, the driver 125 can be a driver in the kernel of the host 110. Each VM 130 can have a corresponding virtual memory 135a or 135b (generally virtual memory 135). Each virtual memory 135 corresponds to a region of physical memory 140 assigned or allocated to the VM 130. Addresses in the physical memory 140 are specified using a Host Physical Address (HPA). Addresses in the virtual memory 135, however, are specified using an I/O virtual address. One reason for the separate addressing schemes is so the VM 130 can serve clients using a consistent addressing scheme, even if the allocation of physical memory 140 to the VM 130 changes, including when the VM 130 is migrated to a different host 110. The separate addressing schemes, however, necessitate an address translation for direct memory access (DMA) operations performed by the device (150) in response to network activity; i.e., sending and receiving data. Direct memory access operations directed to the VMs 130 can bypass the CPU 120 to read from and/or write to the physical memory 140 directly. But because clients request direct memory access operations from the VMs 130, the requests will include the I/O virtual address. Therefore, the role of the device 150 includes translating I/O virtual addresses to host physical addresses, allowing DMA requests to bypass the CPU 120 and interact with the physical memory 140.

Figure 12:
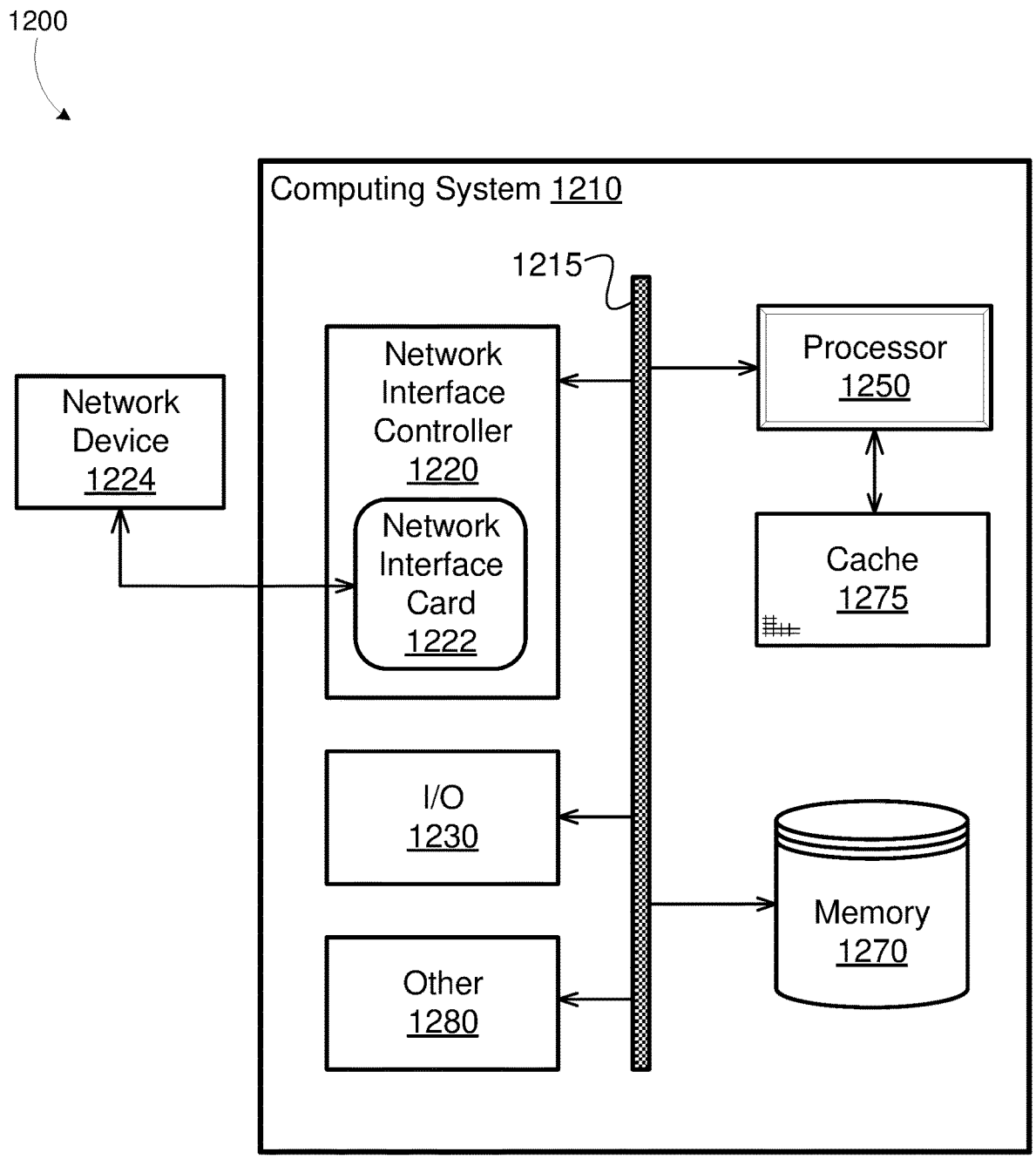
FIG. 12 is a block diagram of an example computing system that may be employed to implement elements of the systems and methods described and illustrated herein, according to an illustrative implementation.

In some implementations, the host 110 can have a configuration similar to that of a computing system 1210 as shown in FIG. 12. For example, it can include a memory such as the memory 1270, and the device 150 can have a configuration similar to that of a network interface card 1222 and/or a network interface controller 1220. In some implementations, the device 150 can be physically separate and possibly physically removed from the host 110. In some implementations, the host 110 and the device 150 can be separate components in a server rack. The computing system 1210 is described in more detail below, in reference to FIG. 12. The elements shown in the computing system 1210 do not all need to be present in some implementations of the host 110; and some implementations of the host 110 may include additional components.

The host 110 includes a physical memory 140. In some implementations, in addition to having memory regions for allocation to the VMs 130, the memory 140 may store computer executable instructions for a real operating system (OS) and applications to be executed on the CPU 120. In some implementations, the memory 140 may store computer executable instructions for the driver 125 to be executed on the CPU 120. In some other implementations, the memory 140 may store computer executable instructions for the virtual machines 130 executing on the CPU 120. In some other implementations, the memory 140 may store data for forwarding to the virtual machines 130, processing by the virtual machines 130, and/or transmission from the virtual machines 130. The memory 140 may include, for example, various types of random access memory (RAM) and/or 3-D XPoint.

The device 150 can translate requests resulting from network traffic received from clients over the network 105. The requests can include memory access operations seeking to directly read from and/or write to regions of virtual memory 135. The device 150 includes an address translation engine (ATE) 160 and three protocol engines 170a, 170b, and 170c (generally protocol engines 170). In some implementations, the device 150 can include more or fewer protocol engines 170. Each protocol engine 170 can be configured to handle requests and responses over different communication protocols; for example, networking (e.g., local area network), remote direct memory access (RDMA), and non-volatile memory express (NVMe). The ATE 160 can translate the I/O virtual addresses in the requests to host physical addresses corresponding to physical memory 140 locations corresponding to the VM 130 servicing the request. In some cases, the ATE 160 may not be able to translate the I/O virtual address. Co-pending U.S. patent application Ser. No. 16/279,462 filed on Feb. 19, 2019, entitled "I/O to Unpinned Memory Supporting Memory Overcommit and Live Migration of Virtual Machines," incorporated herein in its entirety for all purposes, describes systems and methods for handling address translation faults. Such translation faults can occur during, or because of, physical memory 140 reallocation and or migration of the target VM 130. A VM 130 migration involves copying data from a source region of physical memory 140 to a destination region of the same or different physical memory 140, possibly in a different host 110. During a "live" migration of a VM 130, however, it is generally possible to keep the VM 130 available for processing requests while the data is copied. The result, however, is that portions of the source memory region may change during the migration. This disclosure describes systems and methods for monitoring and recording changes to the source regions of memory that occur during a live migration so that the changes can propagated to the destination memory regions.

Figure 2:
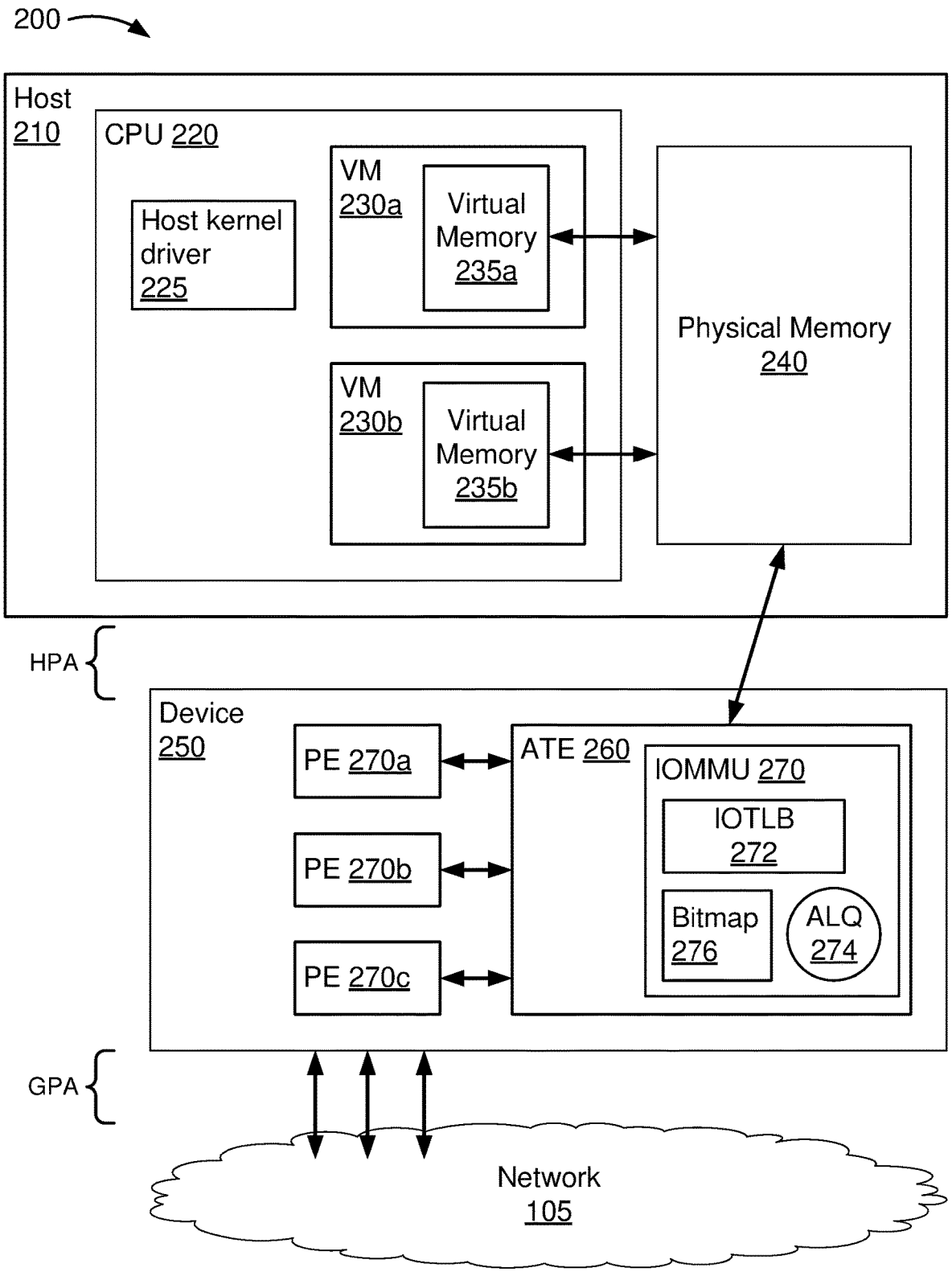
FIG. 2 is a block diagram of an example network environment with a host and an I/O device configured to track page state changes, according to some implementations.

FIG. 2 is a block diagram of an example network environment 200 with a host 210 and an I/O device 250 configured to track virtual machine page state changes, according to some implementations. Similar to the system shown in FIG. 1, the host 210 can be, for example, a server in a data center. The device 250 can be a network device such as a network interface card that handles network requests, received over the network 105, directed to the host.

The host 210 is a host device or server executing one or more processes, such as virtual machines (VMs) 230a and 230b (generally virtual machines 230) on one or more CPUs 220 of the host 210. In some implementations, the processes can be containers or user space applications. The CPU 220 can also execute a driver 225. In some implementations, the driver 225 can be a hypervisor, which is an application that can spin up and spin down VMs 230, migrate VMs 230 to different CPUs 220 or hosts 210, and allocate and reallocate physical memory 240 regions to each VM 230. In some implementations, the driver 225 can be a container manager for managing the operation of virtual machines or containers. In some implementations, the driver 225 can be a driver in the kernel of the host 210. Each VM 230 can have a corresponding virtual memory 235a or 235b (generally virtual memory 235). Each virtual memory 235 corresponds to a region of physical memory 240 assigned or allocated to the corresponding VM 230. Addresses in the physical memory 240 are specified using a host physical address (HPA). Addresses in the virtual memory 235, however, are specified using an I/O virtual address. One reason for the separate addressing schemes is so the VM 230 can serve clients using a consistent addressing scheme, even if the allocation of physical memory 240 to the VM 230 changes, including when the VM 230 is migrated to a different host 210 or undergoes a memory reallocation. The separate addressing schemes, however, necessitate an address translation for direct memory access (DMA) requests received over the network. Direct memory access requests directed to the VMs 230 can bypass the CPU 220 to read from and/or write to the physical memory 240 directly. But because clients request direct memory access operations from the VMs 230, the requests will include the I/O virtual address. Therefore, the role of the device 250 includes translating I/O virtual addresses to host physical addresses, allowing DMA requests to bypass the CPU 220 and interact with the physical memory 240.

The device 250 includes an address translation engine (ATE) 260 for performing translations between I/O virtual addresses and host physical addresses. The ATE 260 includes an I/O memory management unit (IOMMU) 270 having an input/output translation lookaside buffer (IOTLB) 272. The IOMMU 270 controls memory access by the device 250 and provides address resolution and validation. The IOTLB 272 is a local cache of address translation information; for example, including entries for translating virtual addresses to addresses in a physical memory. The ATE 260 translates requests received from clients over the network 105. The requests can include memory access operations seeking to directly read from and/or write to VM 230 virtual memory 235 addresses. The device 250 further includes three protocol engines 270a, 270b, and 270c (generally protocol engines 270). In some implementations, the device 250 can include more or fewer protocol engines 270. Each protocol engine 270 can be configured to handle requests and responses over different communication protocols; for example, networking (e.g., local area network), remote direct memory access (RDMA), and non-volatile memory express (NVMe). The PEs 270 can provide requests in a common format to the ATE 260, which in turn can translate the I/O virtual addresses in the requests to host physical addresses of the physical memory 240 locations corresponding to the VM 230 servicing the request.

Operation of the device 250 can be modified to monitor and record changes to pages of the physical memory 240 made via the device 250 and bypassing the CPU 220. An I/O device such as device 250 will only write to a virtual memory address when a virtual machine has told the device 250 it can write to the memory address via a descriptor in a receive data queue provided to the device 250 by the virtual machine, so the set of pages accessed will always be a subset of descriptors that have been used; however, tracking dirtiness at the page level may result in suboptimal granularity. Thus, benefits can be achieved by monitoring/recording updates at a granularity different from the page size the host 210 is using; for example, the host may use 1 GB page sizes, but transferring 1 GB when only 512 bytes within that page changed may be a poor use of processor resources and interconnect bandwidth. Moreover, in a system with an address translation service (ATS), a large portion of the state machine—that is, the memory addresses accessed—is already available. For example, any access by the I/O device 250 to host memory 240 will result in an address lookup in the IOTLB 272. If there is a miss—that is, no entry for the I/O virtual address in the IOTLB 272—then the ATE 260 sends an ATS probe to the host 210 and, if the address is valid, a translation entry is retrieved from the host 210 and cached in the IOTLB 272.

Therefore, one possible scheme for logging pages accessed from the I/O device 250 leverages the IOTLB 272 of the I/O device 250 by modifying it to remember each memory access. In some cases, the probing and caching operations of the IOTLB 272 can be dispensed with. This solution includes extending the on-device IOMMU 2720 functionality in two ways: First, the IOTLB 272 can be modified to include a PAGE_MASK field. The PAGE_MASK field can represent a range of memory to be copied if a change to a memory region having an address within the PAGE_MASK occurs during a monitoring period; for example, during a live migration. Second, we can add an additional queue of entries presented in an access log queue (ALQ) 274 of the IOMMU 270. The access log queue 274 can be a ring buffer where the IOMMU 270 writes to a tail pointer and software will record and update the head pointer. An example operation would be as follows:

When the I/O device 250 receives a request to make a modification to the physical memory 240 of the host 210, the I/O device 250 can record the I/O virtual address targeted by the request in the IOTLB 272 along with the PAGE_MASK of the memory region in which the I/O virtual address falls. The I/O device 250 can also set a flag (D bit) along with the I/O virtual address and PAGE_MASK. Subsequent hits for access anywhere in the range of PAGE_MASK will find an existing entry in the IOTLB 272 with the D bit set. Any time there is a miss in the IOTLB 272, the IOTLB 272 can write an entry in the ALQ 274 with the I/O virtual address and PAGE_MASK, and update the tail pointer. Software can run through the ALQ 274 periodically or on demand, and use a hash table to construct a bitmap 276 of memory regions touched during the live migration. The host 210 can then use the bitmap 276 to copy those memory regions to complete the live migration. In some implementations, the device 250 can perform the copying of the memory regions. In some implementations, the bitmap 276 may reside in a component or a device other than the ATE 260; for example, in a memory of the device 250 or a memory of the host 210 including the memory 240. The bitmap 276 can be a data structure having a series or array of bits where each bit corresponds to a memory address or region. A reset or "0" bit indicates that no change to the corresponding memory region has been recorded, and a set or "1" bit indicates that a change has been recorded to the corresponding memory region. In some implementations, a "1" can indicate no change and a "0" can indicate a change. A bitmap can be reset at or prior to the beginning of a monitoring period. Individual bits can be set when a memory modification is detected. And individual bits can be reset if the corresponding memory region has been subsequently copied. One benefit of using a bit map to track I/O writes is that if multiple writes are made to a single memory region during the migration process, the value of "1" in the bitmap is sufficient to indicate a dirty region, regardless of how many times that page has been written to. Accordingly, in contrast to previously implemented page logging schemes that rely on queues of memory region updates and track each incremental write to all memory regions, with the bitmap schemes described herein, only the first write to the region during the relevant time period needs to be noted, and no more than a single copy operation is needed to ensure a memory region is up to date upon completion. This reduces the number of copy operations needed to complete the migration as well as the amount of memory needed to track writes to the memory. Several different implementations for conveying the information in the bitmap 276 to the host 210 are discussed subsequently with reference to FIGS. 6-11.

The advantage of the foregoing example is that it can be implemented in existing hardware; for example, in an address translation engine 260 of an I/O device 250, such as a network interface card associated with a host 210. (In practice, the device 250 can be any kind of offload device such as storage device.) An example method of tracking virtual machine page state changes is described below with reference to FIG. 3.

Figure 3:
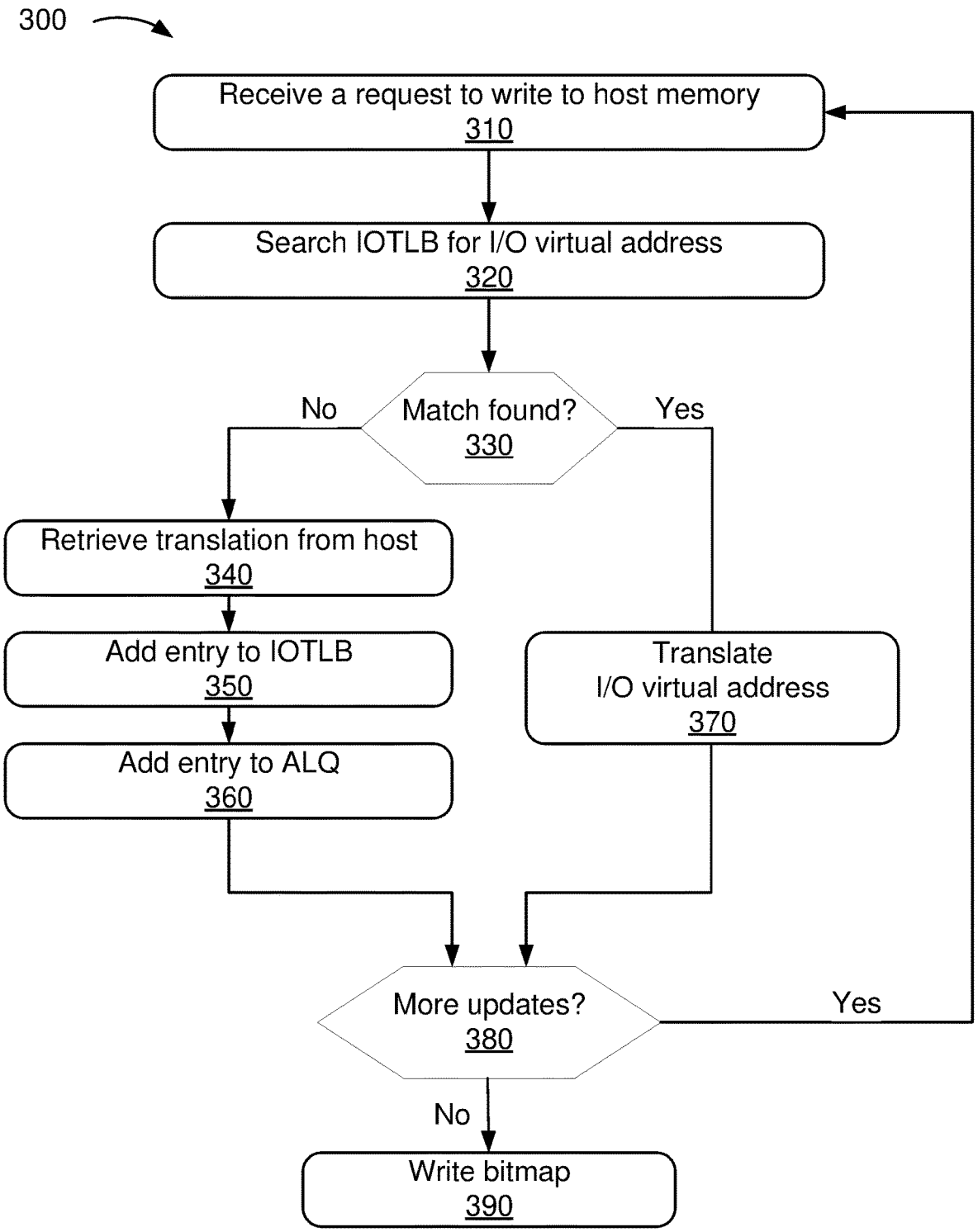
FIG. 3 is a flowchart showing operations of an example method of tracking page state changes, according to some implementations.

FIG. 3 is a flowchart showing operations of an example method 300 of tracking virtual machine page state changes, according to some implementations. The method 300 can be performed using, for example, the device 250, including the address translation engine (ATE) 260, the input/output memory management unit (IOMMU) 270, the input/output translation lookaside buffer (IOTLB) 272, the access log queue (ALQ) 274, and the bitmap 276. The method 300 can be executed when the device receives a command from the CPU of the host to enter a monitoring mode corresponding to a live migration of a virtual machine. The method 300 includes receiving a request to write to host memory (stage 310). The method 300 includes searching the IOTLB for the I/O virtual address (stage 320). If the IOMMU does not find a match in the IOTLB (decision block 330), the method 300 proceeds through stages 340-360. The method 300 includes retrieving a translated address for the I/O virtual address from the host (stage 340). The method 300 includes adding an entry for the translated I/O virtual address to the IOTLB (stage 350). The method 300 includes adding an entry for the I/O virtual address to the ALQ (stage 360). If the IOMMU does find a match in the IOTLB (decision block 330), the method 300 proceeds to stage 370. The method 300 includes translating the I/O virtual address (stage 370). The method 300 includes repeating the stages 310-370 to accumulate updates for writing to the bitmap (decision block 380=yes). When the IOMMU has accumulated an appropriate number of updates (decision block 380=no), the method 300 includes writing to the bitmap used for tracking page state changes (stage 390).

The method 300 includes receiving a request to write to host memory (stage 310). A remote client device can send a request over the network to the host via the device to read from or write a memory region allocated to one of the VMs. The request will indicate the memory region using an I/O virtual address. In the case of a write request, the change to the virtual memory region is recorded if it occurs during a live migration so that the host can update the newly allocated virtual memory region for the associated VM. Accordingly, operation of the device can be modified to maintain a list of altered memory regions on command.

The method 300 includes searching the IOTLB for the I/O virtual address (stage 320). Typically, the ATE will check its local buffer—the IOTLB—to see if it includes an entry for the I/O virtual address that includes the corresponding host physical address (HPA). Because the IOTLB is part of the same hardware (perhaps within the same integrated circuit) as the ATE, such a check can be performed very quickly, which reduces latency for handling requests for frequently-used memory locations.

If the IOMMU does not find a match in the IOTLB (decision block 330), the method 300 proceeds through stages 340-360 to retrieve an HPA corresponding to the I/O virtual address in the request. The method 300 includes retrieving a translated address for the I/O virtual address from the host (stage 340). The IOMMU can send a request for a translation of the I/O virtual address to a driver executing on the host. The driver handles allocation of memory to the various processes executing on the host, so the driver maintains a record of those allocations. The driver can therefore respond to the IOMMU request with a HPA corresponding to the requested I/O virtual address.

The method 300 includes adding an entry for the translated I/O virtual address to the IOTLB (stage 350). The IOMMU can receive the response with the HPA from the driver on the host, and add an entry to the IOTLB that associates the I/O virtual address in the request with the HPA provided by the driver. The IOMMU can include a PAGE_MASK field in the entry. The PAGE_MASK field can be expressed in terms of HPA, and denote the memory region that will be copied if any bits within the memory region have been modified during the monitoring period.

The method 300 includes adding an entry for the I/O virtual address to the ALQ (stage 360). If the HPA in the new entry is the first HPA within a particular PAGE_MASK, the IOMMU can write an entry in the ALQ. When the entry is written to the ALQ, the IOMMU can denote that the change within the PAGE_MASK range has been recorded by flagging a "D" bit in the IOTLB entry. Thus, future hits to memory addresses within the PAGE_MASK will find an existing entry in the IOTLB with the D bit set; the IOMMU thus need not add a new entry to the ALQ.

If the IOMMU does find a match in the IOTLB (decision block 330), the method 300 proceeds to stage 370. The method 300 then includes translating the I/O virtual address (stage 370). The IOMMU can retrieve the HPA corresponding to the requested I/O virtual address. The address translation engine can then facilitate the requested memory operation to the region of the physical memory indicated by the HPA.

The method 300 includes repeating the stages 310-370 to accumulate updates for writing to the bitmap (decision block 380=yes). When the IOMMU has accumulated an appropriate number of updates (decision block 380=no), the method 300 includes writing to the bitmap used for tracking page state changes (stage 390). Software can run through the ALQ periodically or on demand, and use a hash table to construct the bitmap of memory regions touched during the monitoring period; that is, the live migration. The driver and/or the I/O device can use the bitmap to copy those memory regions to complete the live migration. In some implementations, the bitmap may reside in a component or a device other than the address translation; for example, in a memory of the device or a memory of the host, including the host physical memory.

Figure 4:
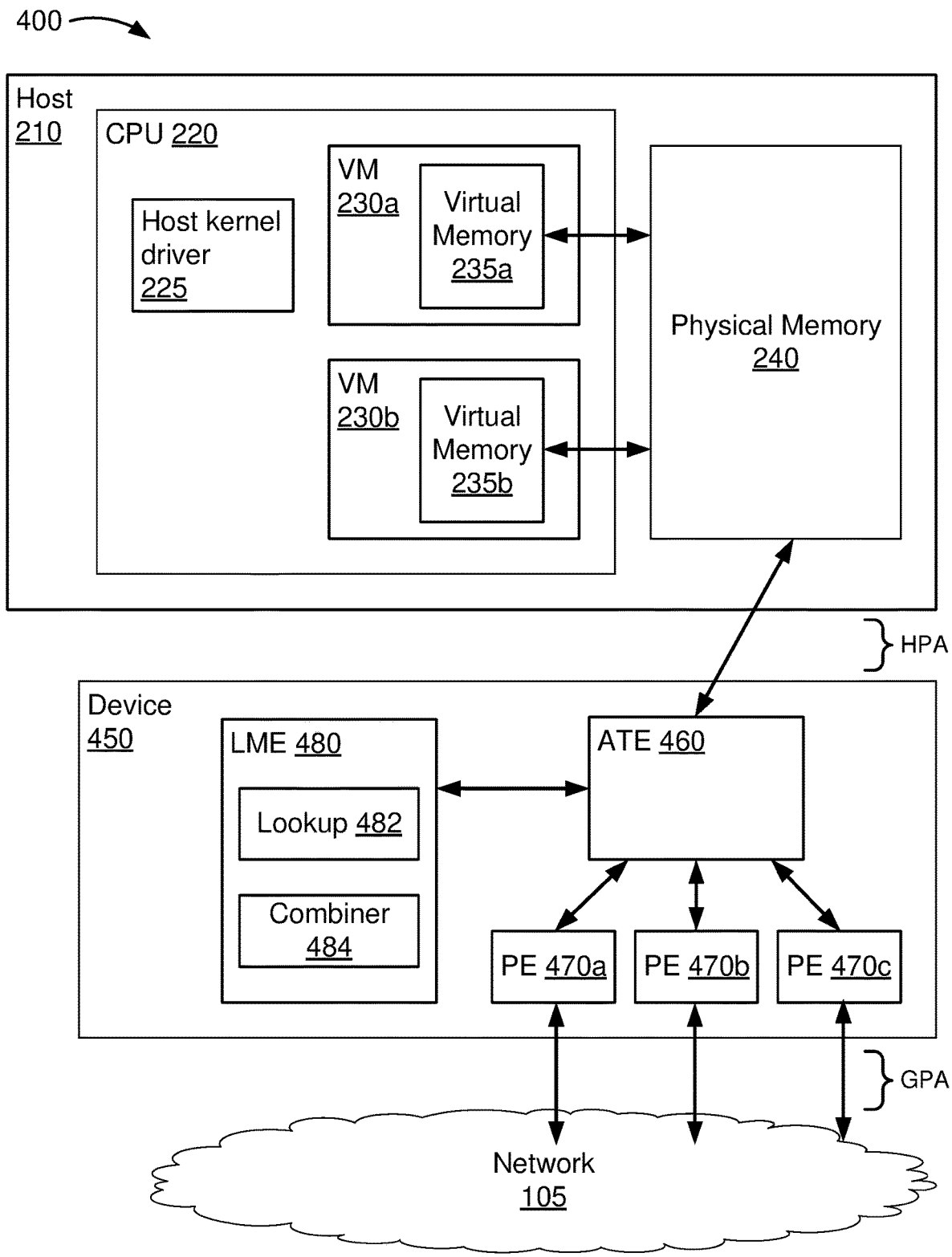
FIG. 4 is a block diagram of an example network environment with a host and an I/O device having a live migration engine configured to track page state changes, according to some implementations.

FIG. 4 is a block diagram of an example network environment 400 with a host 210 and an I/O device 450 having a live migration engine 480 configured to track virtual machine page state changes, according to some implementations. A second possible scheme for logging pages accessed from I/O devices can be implemented using additional hardware in the I/O device 450. The additional hardware can take the form of a live migration engine (LME) 480 that snoops or otherwise monitors direct memory access (DMA) write requests coming into the address translation engine (ATE) 460 from protocol engines (PEs) 470a, 470b, and 470c (generally PEs 470) of the I/O device 450. The LME 480 can be based on a standalone or discrete logic module such as a processor or a programmable logic chip such as an application-specific integrated circuit, or a functional block within a processor or programmable logic chip. The LME 480 converts the requests to set bits in a bitmap where the set bits indicate the dirty bits in the memory 240. Information about the write request is matched against a lookup table 482 to obtain the configuration information needed to set a bit in the bitmap. The updates to the bitmap indicated by the configuration can be fed through a write combiner 484 to reduce the traffic to the memory where the bitmap is stored. In either the IOTLB (e.g., FIG. 2) or LME (e.g., FIG. 4) implementations, one or more of several possible mechanisms can be used for storing and conveying information regarding dirty bits to the software responsible for migrating virtual machines (VMs) 230a and 230b. The mechanisms for storing and conveying the bitmap are discussed subsequently with reference to FIGS. 6-11, including various manners of storing/updating the bitmap in device 450 memory or host 210 memory. For example, either the ATE 460 or LME 480 can store information regarding dirty bits in a bitmap in a dedicated storage on the device, in a double-buffered bitmap in general purpose memory (i.e., of the host), or as atomic updates in general purpose memory.

In the example network environment 400, the host 210 is the same as or similar to the host 210 described previously. The device 450 is similar to the device 250 in that it includes an address translation engine 460 and protocol engines 470, which are similar to the ATE 260 and PEs 270 described previously. Components of the ATE 460 such as the IOMMU may be similar to those discussed above, and are thus not discussed with respect to these embodiments. The device 450 differs from the device 250 in that it includes a live migration engine (LME) 480. The LME 480 includes the lookup table 482 and the write combiner 484, whose functions are described below.

The lookup table 482 is an associative data structure that, in some implementations, can be implemented as a ternary content addressable memory (TCAM); however, other implementations are possible. In some implementations, the lookup table 482 can include fields for region base address, address space identifier such as PASID or BDF, region length, granularity, and bitmap base address. The region base address is subtracted from the request address to get an offset into the memory region. The region length specifies the size of the region addressed and, in some implementations, can be specified in 4 kb units. The granularity specifies the bitmap granularity; that is, what size memory region corresponds to a single bit in the bitmap. The bitmap base address specifies the memory address where the bitmap is stored; for example, in a memory of the device 450.

The write combiner 484 is logic that can reduce the number of writes to the bitmap stored in memory. The write combiner 484 can track writes to the bitmap and avoid sending multiple updates for already dirtied bits until the bitmap is cleared (i.e., when the region of memory specified by the bit has been copied). The write combiner 484 can collect several to many bitmap updates (for example, in some implementations, the write combiner can collect 128 to 8192 bitmap updates), and update the statuses of all of the collected bits in a single write operation. Because the transitions of bits in the bitmap are monotonic—that is, not-dirty to dirty—in some implementations, the write combiner 484 can include, for example "OR" logic that combines dirty "1" bits into bytes for writing to the bitmap.

In an example operation, the LME 480 will monitor address translations handled by the ATE 460. The LME 480 compares the request address with the region base addresses in the lookup table 482. In some implementations, the request address can be masked with a request address mask; however, this may not be necessary for TCAM or various other implementations of the lookup table 482. If no entries match, the LME 480 takes no action. If the request address is less than the region base address, the LME 480 takes no action. If the request address is equal to or greater than the region base address, the region offset is set equal the request address minus the region base address. If the region offset is greater than or equal to the region length, the LME 480 takes no further action. If the region offset is less than the region length, the bitmap position is calculated and the bitmap write address and bitmap mask are queued to the write combiner 484. Using the write combiner 484, the LME 480 can update the bitmap with the accumulated information.

In some implementations, the LME 480 can determine the bitmap write address and bitmap mask as follows. To communicate which memory was modified, the LME 480 can compute which bit in the tracking bitmap to set; this is calculated by dividing the offset into the region by the tracking granularity size and keeping only the quotient, ignoring the remainder. The quotient gives a bit offset into the bitmap. For ease of reduction to practice, this is converted into a word address relative to the start of the bitmap and bit position within that word. These values are given by dividing the bit offset by the number of bits in a word; the quotient will be the word offset, and the remainder will be the bit position within the word. These values are used to generate to a memory modification operation that sets the given bit in the appropriate word relative to the base address of the bitmap.

Granularity of dirty bit tracking can be adjusted with tradeoffs between memory space, processing requirements, and transfer time. For example, in some implementations, different regions of physical memory can be tracked with high or low granularity. Granularity for a particular memory region can be set depending on the frequency of modifications within that memory region.

In some implementations, granularity of dirty bit tracking can be handled in a multi-level scheme. For example, the lookup table of the LME can map memory regions in a tiered, overlapping manner. If the system records a change within a large memory region, the system can record changes at a smaller granularity within that region. For example, a buffer or cache can store indications of page state changes for later writing to the bitmap. The buffer can store the indications in two coextensive, overlapping levels. A first level can include relatively large divisions, indicated by an entry with wide spacing, and a second level can include smaller subdivisions, indicated by an entry with tight spacing. Each first-level division can overlap a plurality of second-level subdivisions. Thus, each address will have two hits: a coarse grain hit with a wide spacing and a fine grain hit with a tight spacing; but no address should have more than two hits. When the I/O device prepares to write to the bitmap, the device can check each first-level division and each second-level division to see if there has been a page state change indicated. Such a scheme could be implemented, for example, in a TCAM using two entries for each memory region: a wide entry and a tight entry. Traditionally a TCAM would return the larger match for a query. In this case, however, both the wide and the tight entries would record changes, but upon creating the bitmap, only the smaller region will be written. Each access may match one or more entries in the lookup table. For each entry that matches, the tracking bitmap is updated as above. Using multiple matches allows more efficient scanning of the tracking bitmaps; for example, tracking dirty subregions of a 1 TB region requires scanning 268 million bits when using a 4 KB granule. Even if only one subregion is dirtied, we still scan the same number of bits. Allowing a second match within the lookup table with a different granule size (say 1 GB) allows us to find that same single subregion by only scanning 262 thousand bits—a factor of 1000 reduction in work. The tradeoff of such a scheme is an increase in updates; for example, for each memory modification, two entries are effectively sent to the write combiner 484 for writing to the bitmap. The combiner 484 may, however, be able to avoid some of this duplication with respect to updates to the bitmap.

In some implementations, the LME 480 can implement a whitelist scheme. For example, the system can designate certain memory regions as unimportant, and either decline to track bits or decline to transfer memory contents. Conversely, in some implementations, the system can designate a certain other memory region such that the contents of the region is always copied regardless of dirty bit tracking.

Before starting the last phase of migration, it is important that all pending bitmap updates be made visible to the processors of the device 450. Nominally, this requires finishing any monitoring, lookup, calculation, and recording operations. The initiation of such a request to complete these operations may be separate from LME 480 configuration updates; for example, the control plane may make multiple updates prior to forcing visibility of pending updates. The processors of the device 450 are able to initiate the flush operation as well as be able to determine when it has completed.

An example method of tracking virtual machine page state changes with a live migration engine is described below with reference to FIG. 5.

Figure 5:
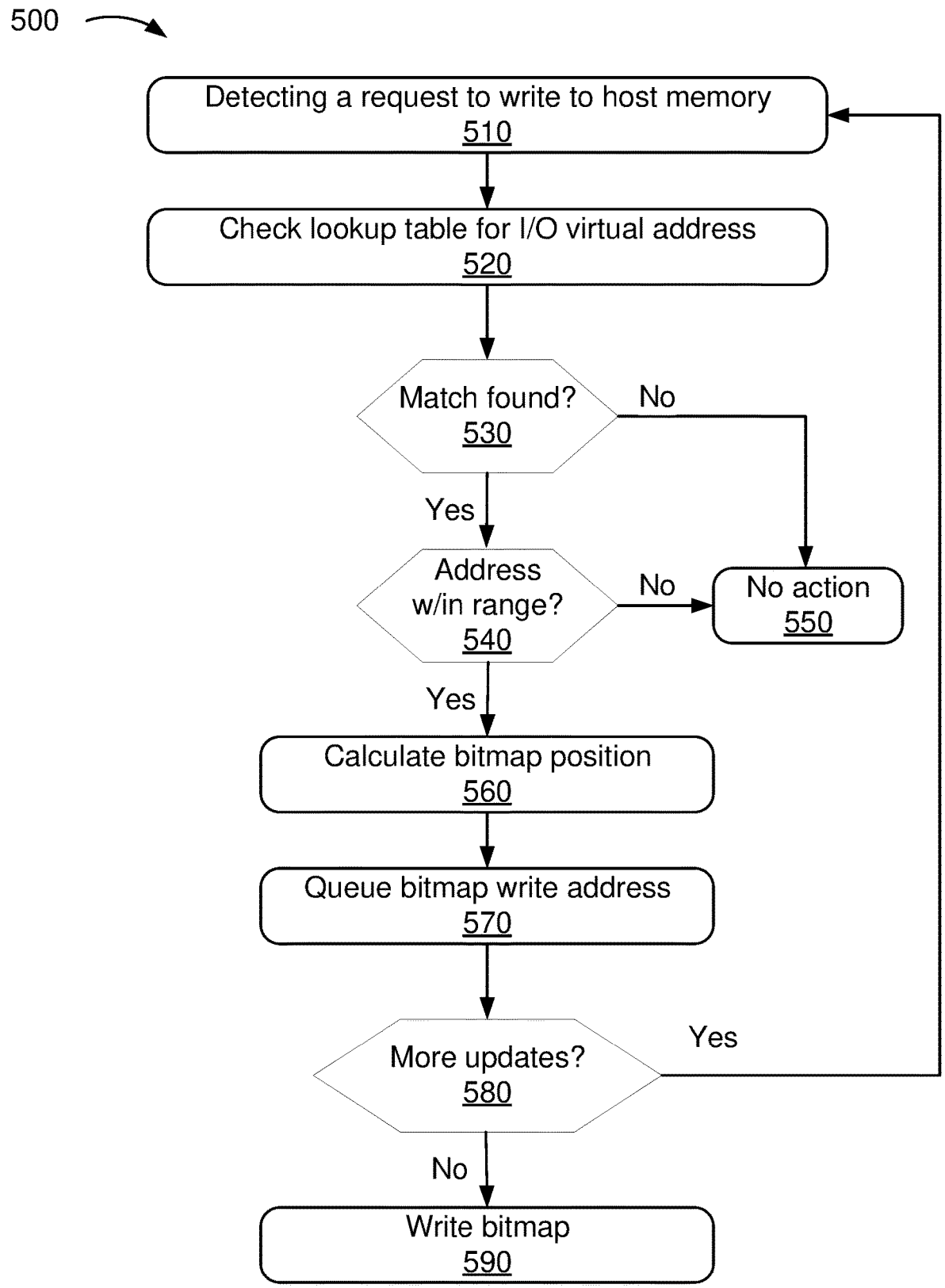
FIG. 5 is a flowchart showing operations of an example method of tracking page state changes with a live migration engine, according to some implementations.

FIG. 5 is a flowchart showing operations of an example method 500 of tracking virtual machine page state changes with a live migration engine, according to some implementations. The method 500 can be performed using, for example, the device 450, including the live migration engine (LME) 580, the lookup table 482, and the write combiner 484. The method 500 can be executed when the live migration engine receives a command from the CPU of the host to enter a monitoring mode corresponding to a live migration of a virtual machine. The method 500 includes detecting a request to write to host memory (stage 510). The method 500 includes checking the lookup table for the I/O virtual address (stage 520). If the LME does not find a match in the lookup table (decision block 530), or if the I/O virtual address is out of range (decision block 540), the LME takes no action. If the LME does find a match in the lookup table and the I/O virtual address is within range, the method 500 includes continuing onto stage 560 and calculating a bitmap position corresponding to the written-to address. The method 500 includes queuing the bitmap write address and bitmap mask to the write combiner (stage 570). The method 500 includes repeating the stages 510-570 to accumulate updates for writing to the bitmap (decision block 580=yes). When the write combiner has accumulated an appropriate number of updates (decision block 580=no), the method 500 includes writing to the bitmap used for tracking page state changes (stage 590).

The method 500 includes detecting a request to write to host memory (stage 510). The LME monitors the activity of the address translation engine (ATE), particularly listening for requests to write to or modify memory regions. The requests can be direct memory access (DMA) or remote direct memory access (RDMA) request received over the network. A request to modify a memory region will include an I/O virtual address corresponding to a memory region in the physical memory of the host allocated to a virtual machine (VM) executing on the host.

The method 500 includes checking the lookup table for the I/O virtual address (stage 520). The LME will check the I/O virtual address in the lookup table to see if there is an entry associated with the I/O virtual address. If the LME does not find a match in the lookup table (decision block 530), or if the I/O virtual address is out of range (decision block 540), the LME takes no action. If there is no match for the I/O virtual address, or the I/O virtual address is out of range, the indication is that changes at the I/O virtual address are not being tracked.

If the LME does find a match in the lookup table and the I/O virtual address is within range, the method 500 includes continuing on to stage 560 and calculating a bitmap position corresponding to the written-to address. Each bit of the bitmap corresponds to a region in the physical memory. A "1" at a bit location in the bitmap indicates that the corresponding region of the physical memory has been modified during the monitoring period and should be copied to complete the live migration. (In some implementations, the logic can be reversed; that is, a "0" indicates a modification while a "1" indicates no change.) To record the change to the memory region indicated by the HPA, the LME calculates the position of the bit in the bitmap that corresponds to the HPA.

The method 500 includes queuing the bitmap write address and bitmap mask to the write combiner (stage 570). The LME can then add the bit position to queue for combining and writing.

The method 500 includes repeating the stages 510-570 to accumulate updates for writing to the bitmap (decision block 580=yes). Once a number of writes have been queued by the LME, the write combiner can combine them for writing to the bitmap. In some implementations, the LME can write just a single bit to the bitmap. In some implementations, the write combiner can combine a number of bits for writing to the bitmap using fewer total write operations than would be needed to write each bit individually. For example, the write combiner can collect the bits into words for writing, where the words are 8, 16, 32, 64, or more bits long. In some implementations, the write combiner can combine dozens, hundreds, or thousands of bits for writing, and write them as combined bytes. When the write combiner has accumulated an appropriate number of updates (decision block 580=no), the method 500 includes writing to the bitmap used for tracking page state changes (stage 590). The write combiner can accumulate bits until one of several conditions occurs, depending on the implementation. The write combiner can collect a predetermined number of bits and write them to the bitmap once it has collected, for example, 256 bits. The write combiner can write to the bitmap at predetermined intervals, for example, every millisecond. The write combiner can write to the bitmap based on a request from a driver executing on the host and executing the virtual machine migration; for example, once the driver has completed the first pass of copying memory from the source memory region to the destination memory region for the migrating virtual machine and requests a flush of the write combiner.

The LME and/or the write combiner can then write the accumulated bits to the bitmap in one of several ways depending on where the bitmap is stored and how bitmap information is transferred to the driver executing the live migration. The mechanisms for storing and conveying the bitmap are discussed in further detail below with reference to FIGS. 6-11, including various manners of storing/updating the bitmap in memory of the device or the host.

Figure 6:
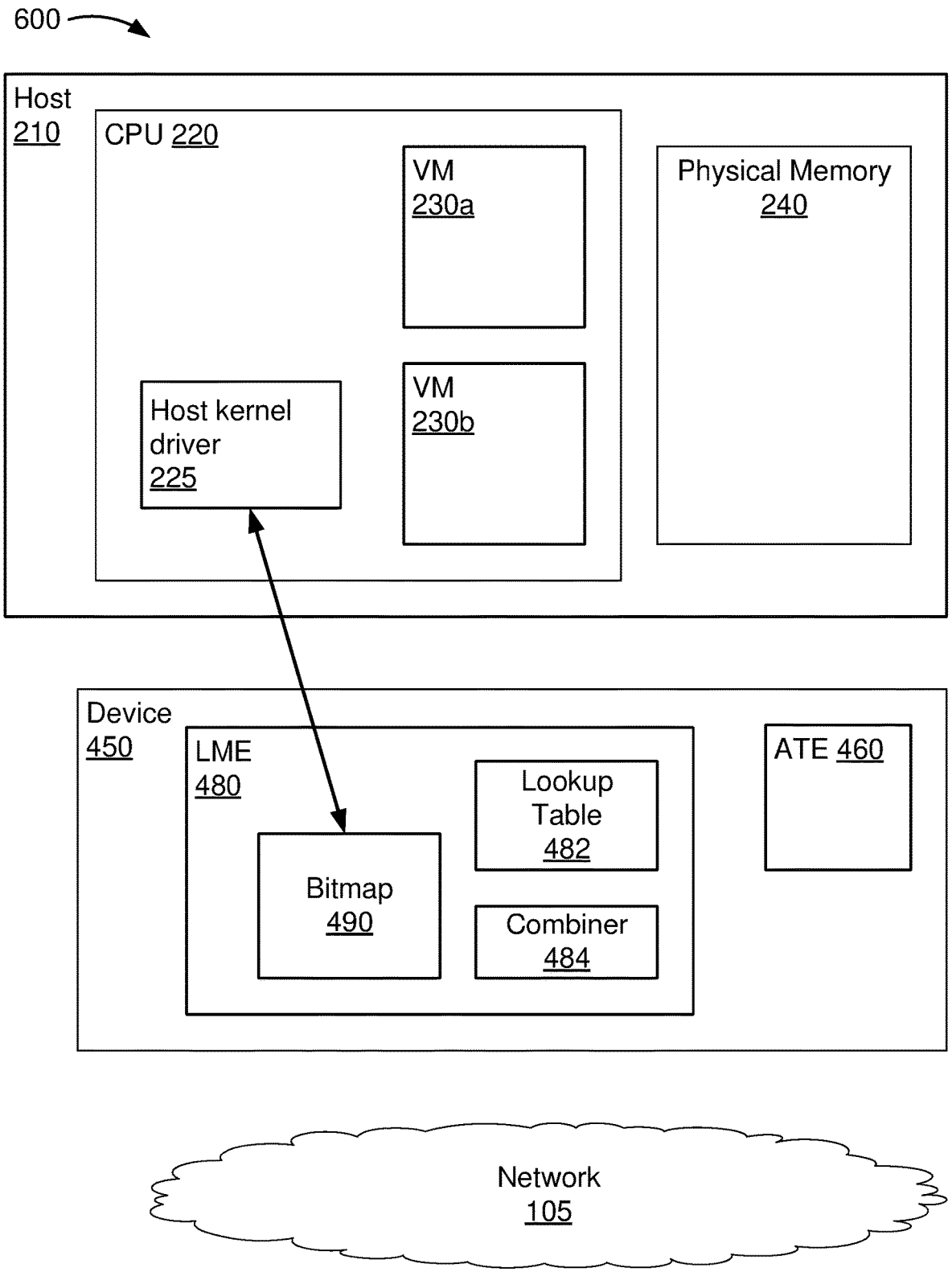
FIG. 6 is a block diagram of an example network environment with a host and an I/O device configured to track page state changes using a dedicated bitmap storage within the live migration engine, according to some implementations.

FIG. 6 is a block diagram of an example network environment 600 with a host 210 and an I/O device 450 configured to track virtual machine page state changes using a dedicated bitmap storage 490 within the live migration engine 480, according to some implementations. The host 210 and the device 450 can be similar to those previously described. In the implementations illustrated by FIG. 6, the LME 480 can include a random access memory (RAM) or a register bit array for storing the bitmap 490 directly inside the LME 480. The migration software (e.g., the driver 225) will read bitmap information from the LME 480, and the LME 480 can enforce an atomic handoff of dirty bit information to the CPU 220. Such implementations would have the advantage that all atomicity requirements are enforced by the LME 480 within the LME logic. The LME 480 can arbitrate accesses within its own hardware and ensure that no updates to the bitmap 490 get lost.

An advantage of this particular manner of tracking page state changes is that, unlike the implementation described below with reference to FIG. 8, only a single copy of the bitmap is stored, reducing the memory requirement by half. In addition, relative to the implementation shown in FIG. 8, this manner of tracking does not require flush/buffer switch process, which can be expensive in terms of CPU cycles 220. Finally, this manner of tracking page state changes also benefits from fewer host memory accesses than in the implementations described below with reference to FIGS. 8 and 10.

Although this manner of tracking is described with regard to the device 450 and host 210 shown in FIG. 4, the same operations could be performed by the device 250 and host 210 shown in FIG. 2. An example operation of tracking page state changes using a dedicated bitmap storage within the live migration engine is described below with reference to FIG. 7.

Figure 7:
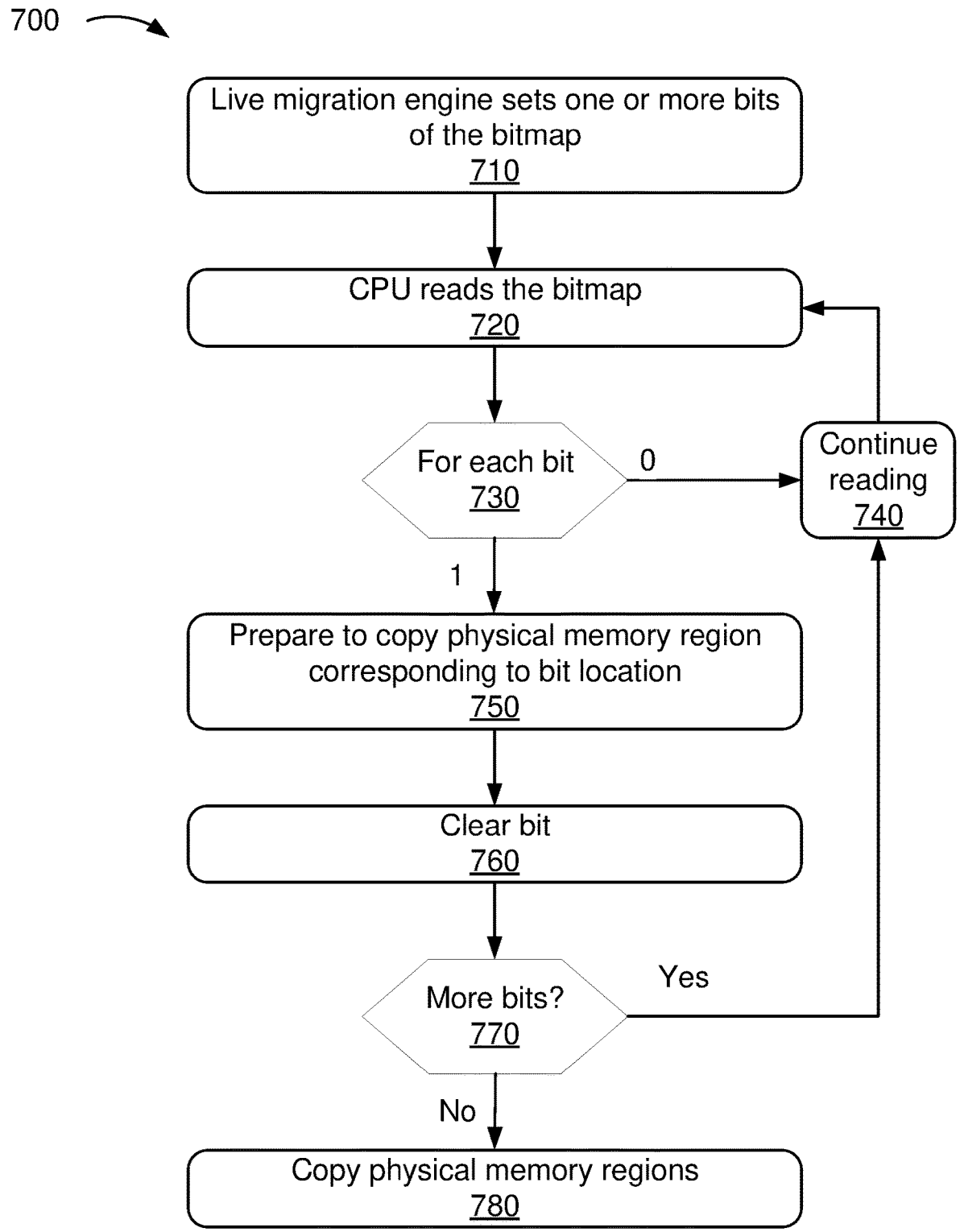
FIG. 7 is a flowchart showing operations of an example method of tracking page state changes using a dedicated bitmap storage within the live migration engine, according to some implementations.

FIG. 7 is a flowchart showing operations of an example method 700 of tracking virtual machine page state changes using a dedicated bitmap storage within the live migration engine, according to some implementations. The operations of the method 700 can be performed by a live migration engine (LME) such as the LME 480 and a CPU such as the CPU 220 executing a driver 225. The LME can detect a write request and prepare a bit for writing to the bitmap according to the operations described with regard to FIGS. 4 and 5. In that sense, the method 700 can be thought of as an extension of the method 500. The method 700 includes writing, with the LME, one or more bits to the bitmap (stage 710). The method 700 includes reading, by the CPU, the bitmap (stage 720). The CPU will check each bit of the bitmap. If a bit is a zero (decision block 730=0), the zero indicates no change to the region of the physical memory corresponding to the location of the zero bit. The method 700 will continue reading each bit of the bitmap (stage 740). If a bit is a one (decision block 730=1), the one indicates that the LME has recorded a change at a region of the physical memory corresponding to the one bit. The CPU (either a CPU of the host or a CPU of the I/O device) will thus prepare to copy that region of the physical memory (stage 750). In some implementations, the CPU may collect and/or combine several or many such copy operations to perform in a batch operation. Once the CPU has noted the one bit and prepared to copy the corresponding region of physical memory, the CPU can clear the bit; that is, the CPU can set the bit value back to zero (stage 760). Note that the CPU should be able to guarantee that it will copy memory corresponding to any bits that it clears. That is, a one bit should never be lost, otherwise the virtual machine migration could experience problems or failures. The CPU may clear "one" bits when it has taken responsibility for copying the corresponding region of memory, or risk wasting resources making unnecessary copies; however, redundant copies are safe, while omitted copies result in errors. The CPU will continue checking bits until it has completed the entire bitmap (decision block 770=no). The CPU can then copy the physical memory regions indicated by the bitmap (stage 780). In some implementations, the CPU can begin copying regions of physical memory (stage 780) while it is reading the bitmap (stages 720 to 770). That is, the CPU does not need to wait for all bits to be read (essentially copying the entire bitmap) before it begins copying the corresponding memory regions. In some implementations, the live migration engine can continue setting bits (stage 710) while the CPU reads the bitmap (stages 720 to 780). In some implementations, the CPU can continue reading through the bitmap in a cyclical manner, capturing new updates with each cycle, until a live migration is completed. Although this manner of tracking is described with regard to the device 450 and host 210 shown in FIG. 4 as a continuation of the method 500 shown in FIG. 5, the same operations could be performed by the device 250 and host 210 shown in FIG. 2 as a continuation of the method 300 shown in FIG. 3.

Figure 8:
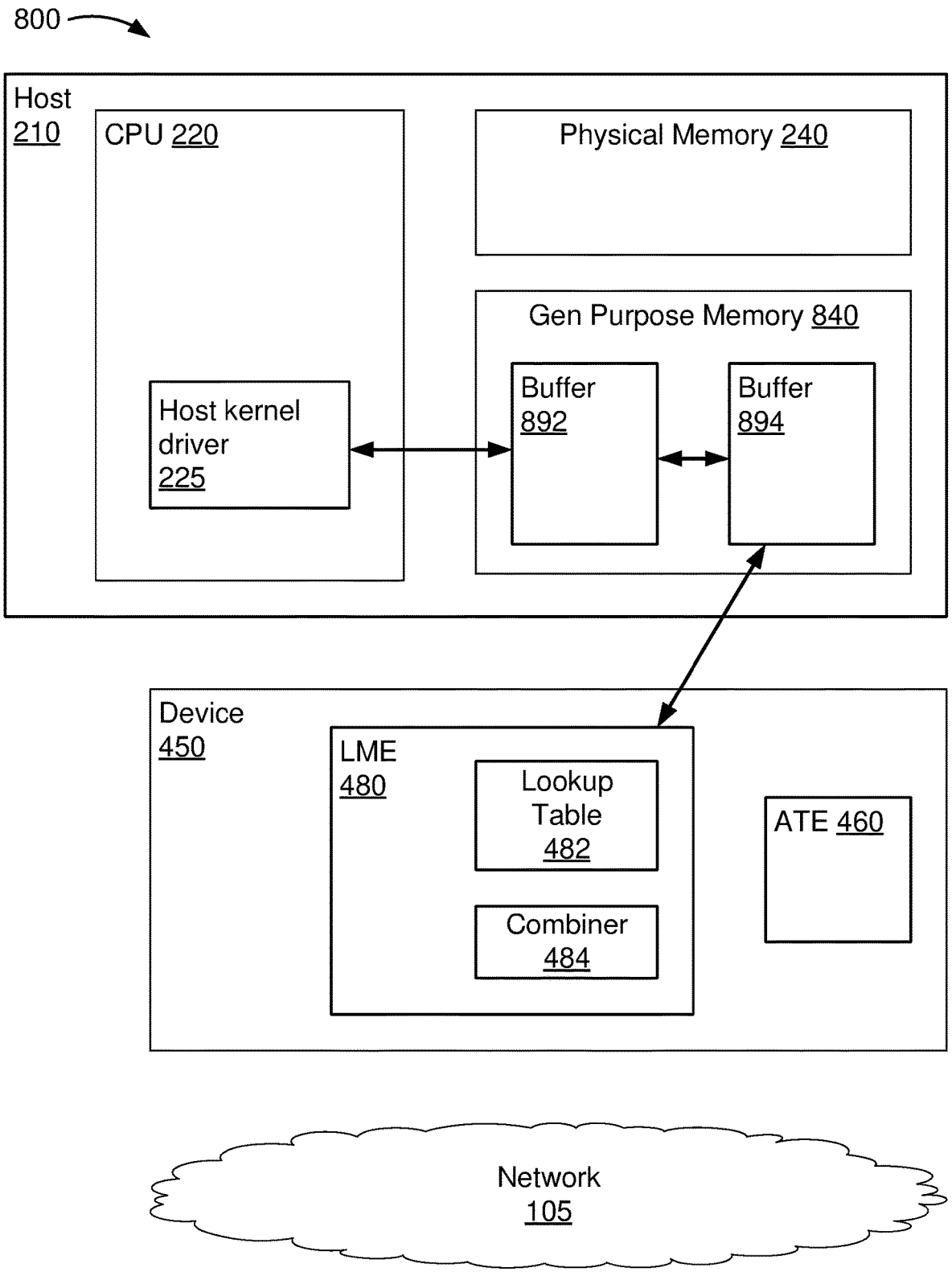
FIG. 8 is a block diagram of an example network environment with a host and an I/O device configured to track page state changes using a double buffered bitmap in a memory of the host, according to some implementations.

FIG. 8 is a block diagram of an example network environment 800 with a host 210 and an I/O device 450 configured to track virtual machine page state changes using a double buffered bitmap 892 and 894 in a memory 840 of the host, according to some implementations. The host 210 and the device 450 can be similar to those previously described. In the implementations illustrated by FIG. 8, two buffers 892 and 894 are created in the general purpose memory 840 of the host 210. The first buffer 892 is owned by the CPU 220/driver 225 and the second buffer 894 is owned by the LME 480. The general purpose memory 840 can be memory that the processor running the migration code ordinarily uses for the rest of its processing; for example, DRAM of the host 210 or cache memory on the CPU 220. In some implementations, the general purpose memory 840 can be the same, within, or contiguous with the physical memory 240.

When the driver 225 makes a migration pass, it tells the LME 480 to switch buffers and initiate a flush for all pending updates. The buffer-switch is complete once the LME 480 indicates that all writes are visible in the buffer. In some implementations, a write-to-read memory barrier can be used to prevent premature reading from the LME-owned buffer 894. Essentially, the CPU should only read from the buffer when the buffer is truly CPU-owned. The driver 225 can read/clear bits in the CPU owned buffer 892, while LME 480 sets bits in the LME owned buffer 894. This avoids data races between the LME 480 setting bits and the driver 225 clearing bits. An advantage of this approach is that it only relies on ordinary memory writes between the LME 480, the CPU 220, and the memory 840 to implement; and the ability to implement a basic memory barrier. A further advantage is that LME can issue cache-line sized writes that can directly allocate in a flash memory with no traffic to RAM. The atomic-update approach might result in additional reads to RAM, as the LME can only issue atomic updates of up to 64 bits.

Because LME 480 sets individual bits, rather than writing whole bytes or words, it performs a read-modify-write in order to set those bits. Thus, a practical implementation could include the following features:

1. Write merging for bit-set events that overlap within the same unit of memory. The unit of memory could be as small as a byte, or as large as is practical. Such operations could be performed, for example, using the write combiner 484.
2. A small cache to hold bitmap information for multiple non-overlapping regions, so as to eliminate most of the reads associated with read-modify-write events.
3. A write queue for buffering writes to the memory system. The LME 480 should be able to keep up with the full rate of memory modification events. If the LME 480 fails to do so, the LME 480 should consider the entire region for which it dropped an event as "dirty," and communicate this to the CPU so the CPU can treat the entire region as dirty as well.

An advantage of this particular manner of tracking page state changes is that, unlike the implementation described above with reference to FIG. 6, memory used to store the bitmap is not stranded. That is, the system can change the size of the bitmap based on the desired tracking granularity, and if granularity is decreased, the memory no longer required for the bitmap can be freed up for other purposes. Conversely, because the general purpose memory 840 would presumably be much larger than a dedicated memory within the LME 480, the system will have more flexibility to enlarge the bitmap and increase the granularity of tracking. This manner of tracking also benefit in that the CPU 220 can read and reset bits in the general purpose memory 840, which is local to the CPU 220, with many fewer cycles than required to read and write to a memory of the LME 480.

Although this manner of tracking is described with regard to the device 450 and host 210 shown in FIG. 4, the same operations could be performed by the device 250 and host 210 shown in FIG. 2. An example operation of tracking virtual machine page state changes using a double buffered bitmap and in a memory of the host is described below with reference to FIG. 9.

Figure 9:
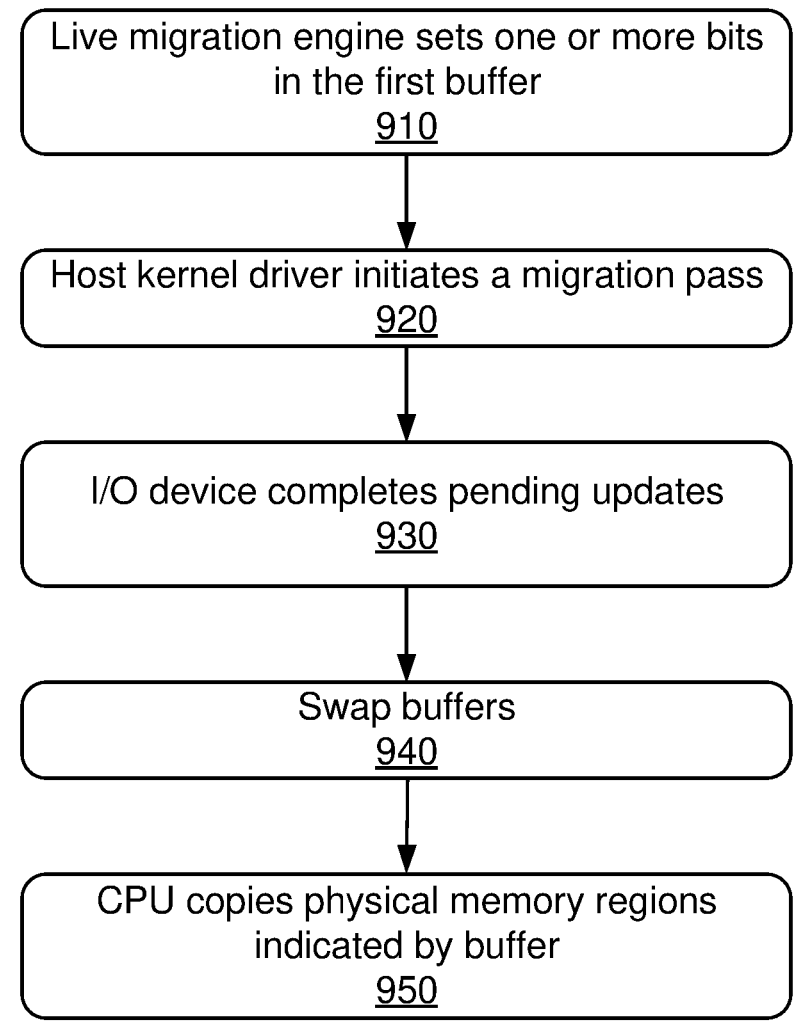
FIG. 9 is a flowchart showing operations of an example method of tracking page state changes using a double buffered bitmap in a memory of the host, according to some implementations.

FIG. 9 is a flowchart showing operations of an example method 900 of tracking virtual machine page state changes using a double buffered bitmap in a memory of the host, according to some implementations. The operations of the method 900 can be performed by a live migration engine (LME) such as the LME 480 and a CPU such as the CPU 220 executing a driver 225. The LME can detect a write request and prepare a bit for writing to the bitmap according to the operations described with regard to FIGS. 4 and 5. In that sense, the method 900 can be thought of as an extension of the method 500. The method 900 includes setting, using the live migration engine, one or more bits in the first buffer (stage 910). The method 900 include initiating, by the driver, a migration pass (stage 920). When the driver initiates the migration pass, it will send a notification to the live migration engine to flush any pending updates—that is, any updates for previously detected write requests where the updates are still queued in, for example, a write combiner, and have not yet been written to the first buffer. The method 900 includes the I/O device completing writing all pending updates to the first buffer (stage 930). The method 900 includes swapping the first buffer, which is owned by the LME, with the second buffer, which is owned by the CPU (stage 940). The CPU, and thus the driver executing on the CPU, now has access to the bitmap updates the LME made previously to the first buffer. Meanwhile, the LME can begin writing new updates in the second buffer for future migration. Ideally, the CPU would have cleared all bits in this buffer before handing it back to the LME, thus preventing any delay before the LME can begin writing to the buffer. In some implementations, however, the LME may issue DMA requests to zero out the buffer. The method includes copying, by a CPU of the host or a CPU of the I/O device, the physical memory regions indicated by the one bits in the bitmap previously written to the first buffer (stage 950). Although this manner of tracking is described with regard to the device 450 and host 210 shown in FIG. 4 as a continuation of the method 500 shown in FIG. 5, the same operations could be performed by the device 250 and host 210 shown in FIG. 2 as a continuation of the method 300 shown in FIG. 3.

Figure 10:
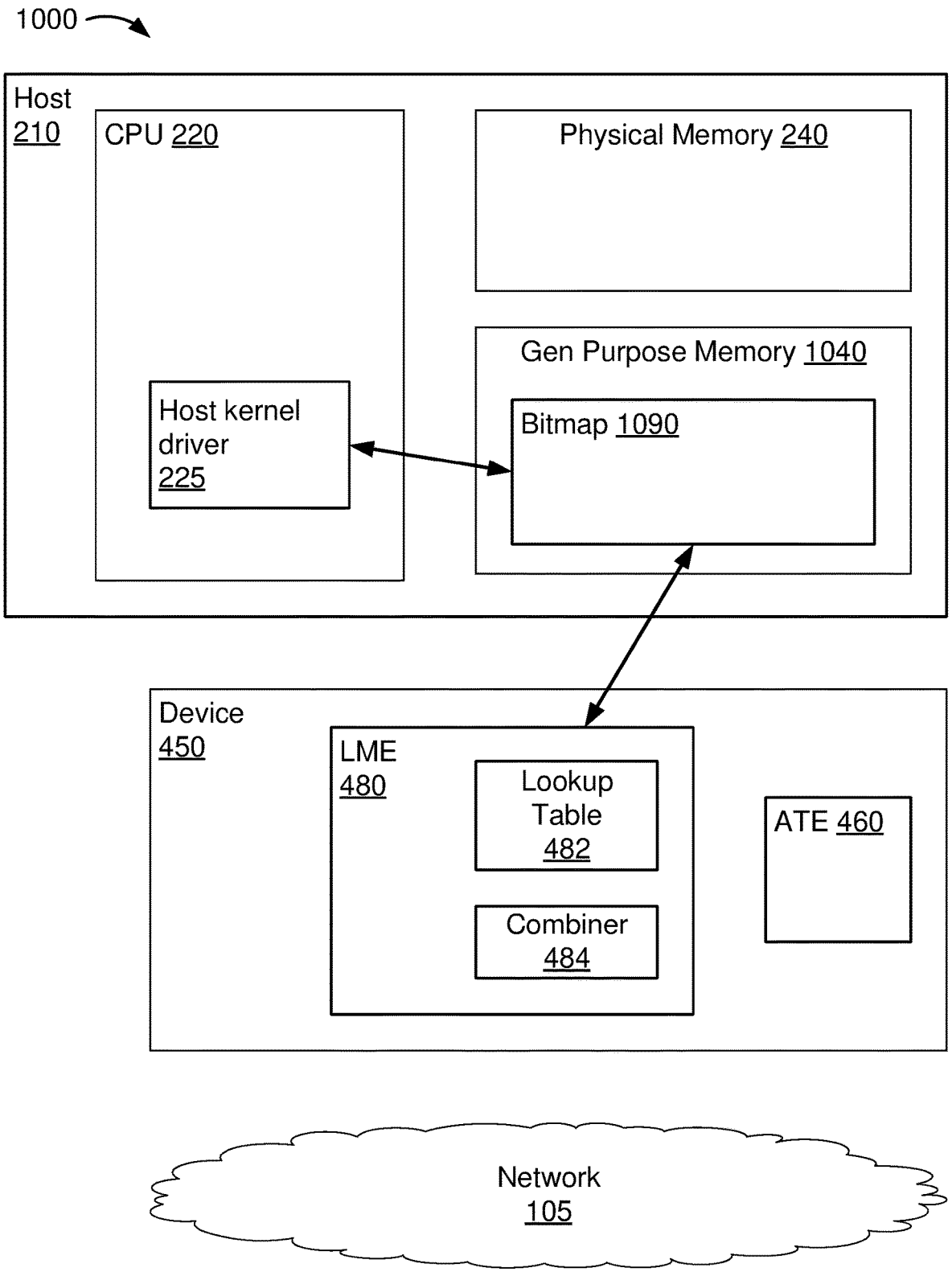
FIG. 10 is a block diagram of an example network environment with a host and an I/O device configured to track page state changes using atomic updates in a memory of the host, according to some implementations.

FIG. 10 is a block diagram of an example network environment 1000 with a host 210 and an I/O device 450 configured to track virtual machine page state changes using atomic updates in a memory 1040 of the host 210, according to some implementations. The host 210 and the device 450 can be similar to those previously described. In the implementations illustrated by FIG. 10, a bitmap 1090 is created in a general purpose memory 1040 of the host 210. Similar to the general purpose memory 840, the general purpose memory 1040 can be memory that the processor running the migration code ordinarily uses for the rest of its processing; for example, DRAM of the host 210 or cache memory on the CPU 220. In some implementations, the general purpose memory 1040 can be the same, within, or contiguous with the physical memory 240.

If the CPU 220 and interconnect directly support atomic bit-set and atomic exchange or bit-test-and-clear operations, then the LME 480 and the CPU 220 can cooperate directly within the same bitmap 1090. This eliminates the space overhead of the double-buffer, and limits the cost of a flush operation to a final flush at the end, rather than a flush with each migration pass. The following operations help support tracking page state changes using this approach:

First, the LME 480 can issue atomic bit-set operations, where LME 480 can write a bit-pattern to a location in memory 1090, and the interconnect guarantees that any 1 bit in that pattern atomically sets the corresponding bit in the target address.

Second, the CPU 220 can atomically test and clear, meaning that the CPU 220 needs to be able to discover what bits are set, and clear only those bits that it saw were set.

There may be multiple ways to implement either of these actions. For example, certain CPUs offer an atomic swap operation which is adequate for the purpose. Such CPUs may also offer an atomic test-and-clear operation (LDCLR). Either of these operations is suitable from the CPU side. In any case, the CPU should only reset bits when it has read the bit and taken responsibility for the corresponding update; and the LME should only set bits without clearing unrelated bits (i.e., bits for which the CPU has not taken responsibility).

This approach generates a large number of potential memory accesses, similar to the previous approach discussed with references to FIGS. 8 and 9. While it may not perform read-modify-writes, it still generates a large number of writes. Therefore, a practical LME 480 implementation will still implement write merging, and write queuing. The details may be somewhat different, though, as (a) the LME 480 does not need to read from memory it is updating, and (b) the appropriate write-merge granularity may be different.

Regarding (b): in some CPU protocols, atomic accesses are limited to 64 bits. Therefore it may make sense to limit the merge width to 64 bits. That said, there can still be an advantage to merging all the way to a 64-byte boundary, so that when LME evicts a line from the cache, the cache receives eight updates for the same 64-byte cache line in its memory. If the cache needs to allocate that line by reading it from DRAM, all eight writes will queue up in the cache, and get committed to the line in rapid succession once the read from DRAM completes.

An advantage of this particular manner of tracking page state changes is that, unlike the implementation described above with reference to FIG. 8, only a single copy of the bitmap is stored, reducing the memory requirement by half. In addition, relative to the implementation shown in FIG. 8, this manner of tracking does not require flush/buffer switch process, which can be expensive in terms of CPU cycles 220. Moreover, unlike the implementation described above with reference to FIG. 6, memory used to store the bitmap is not stranded. That is, the system can change the size of the bitmap based on the desired tracking granularity, and if granularity is decreased, the memory no longer required for the bitmap can be freed up for other purposes. Conversely, because the general purpose memory 1040 would presumably be much larger than a dedicated memory within the LME 480, the system will have more flexibility to enlarge the bitmap and increase the granularity of tracking. Finally, this manner of tracking also benefit in that the CPU 220 can read and reset bits in the general purpose memory 1040, which is local to the CPU 220, with many fewer cycles than required to read and write to a memory of the LME 480.

Although this manner of tracking is described with regard to the device 450 and host 210 shown in FIG. 4, the same operations could be performed by the device 250 and host 210 shown in FIG. 2. An example operation of tracking virtual machine page state changes using atomic updates in a memory of the host is described below with reference to FIG. 11.

Figure 11:
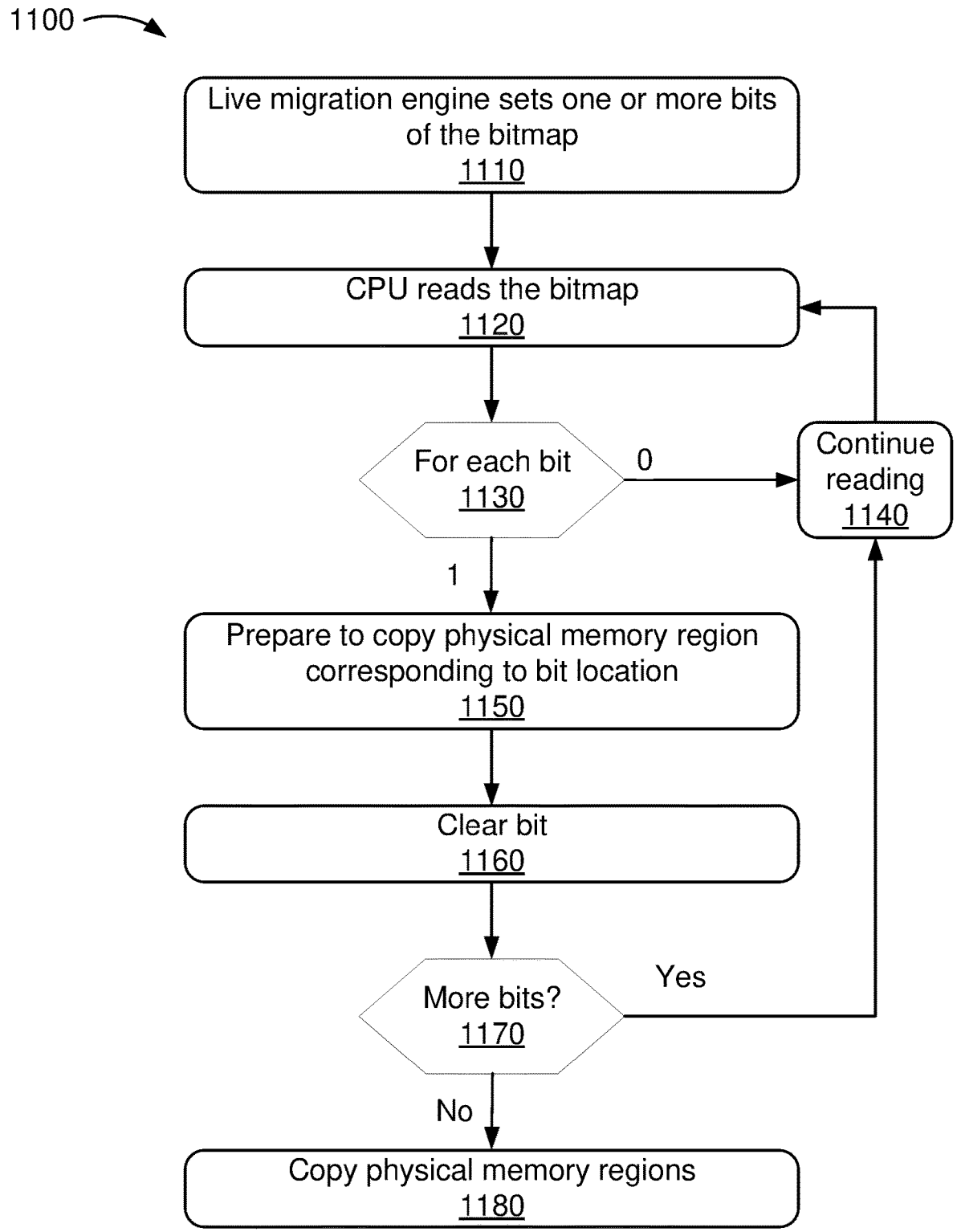
FIG. 11 is a flowchart showing operations of an example method of tracking page state changes using atomic updates in a memory of the host, according to some implementations.

FIG. 11 is a flowchart showing operations of an example method 1100 of tracking virtual machine page state changes using atomic updates in a memory 1040 of the host 210, according to some implementations. The operations of the method 1100 can be performed by a live migration engine (LME) such as the LME 480 and a CPU such as the CPU 220 executing a driver 225. The LME can detect a write request and prepare a bit for writing to the bitmap 1090 according to the operations described with regard to FIGS. 4 and 5. In that sense, the method 1100 can be thought of as an extension of the method 500. The method 1100 includes writing, with the LME, one or more bits to the bitmap (stage 910). The method 1100 includes reading, by the CPU, the bitmap (stage 1120). The CPU will check each bit of the bitmap. If a bit is a zero (decision block 1130=0), the zero indicates no change to the region of the physical memory corresponding to the location of the zero bit. The method 1100 will continue reading each bit of the bitmap (stage 1140). If a bit is a one (decision block 1130=1), the one indicates that the LME has recorded a change at a region of the physical memory corresponding to the one bit. The CPU (either a CPU of the host or a CPU of the I/O device) will thus prepare to copy that region of the physical memory (stage 1150). In some implementations, the CPU may collect and/or combine several or many such copy operations to perform in a batch operation. Once the CPU has noted the one bit and prepared to copy the corresponding region of physical memory, the CPU can clear the bit; that is, the CPU can reset the bit value back to zero (stage 1160). Note that the CPU should be able to guarantee that it will copy memory corresponding to any bits that it clears. That is, a one bit should never be lost, otherwise the virtual machine migration could experience problems or failures. The CPU should also be able to clear one bits when it has taken responsibility for copying the corresponding region of memory, or risk wasting resources making unnecessary copies; however, a redundant copy is always safe while an omitted copy generally results in an error. The CPU will continue checking bits until it has completed the entire bitmap (decision block 1170=no). The CPU can then copy the physical memory regions indicated by the bitmap (stage 1180). In some implementations, the CPU can begin copying regions of physical memory (stage 180) while it is reading the bitmap (stages 1120 to 1170). That is, the CPU does not need to wait for all bits to be read (essentially copying the entire bitmap) before it begins copying memory. In some implementations, the live migration engine can continue setting bits (stage 1110) while the CPU reads the bitmap (stages 1120 to 1180). In some implementations, the CPU can continue reading through the bitmap in a cyclical manner, capturing new updates with each cycle, until a live migration is completed. No synchronization between the LME and the CPU is required. Although the respective cycling through the bitmap by the LME and the CPU may seem like a race condition, it is a race condition that is safe. That is, if the CPU misses an update in one cycle, it can capture it in the next cycle. For example, consider the following repeating sequence of operations:

1. LME sets bit for page X to 1
2. CPU atomic-exchanges a 0 for page X
3. More data arrives for page X, and LME sets page X back to 1
4. CPU migrates page X In step 4, the CPU may migrate a mix of data from before step 3 and after step 3. But, because LME set the bit back to 1, the CPU will capture the updated data on the next cycle.

Although this manner of tracking is described with regard to the device 450 and host 210 shown in FIG. 4 as a continuation of the method 500 shown in FIG. 5, the same operations could be performed by the device 250 and host 210 shown in FIG. 2 as a continuation of the method 300 shown in FIG. 3.

FIG. 12 is a block diagram illustrating a general architecture for a computer system 1200 that may be employed to implement elements of the systems and methods described and illustrated herein, according to an illustrative implementation.

In broad overview, the computing system 1210 includes at least one processor 1250 for performing actions in accordance with instructions and one or more memory devices 1270 or 1275 for storing instructions and data. The illustrated example computing system 1210 includes one or more processors 1250 in communication, via a bus 1215, with at least one network interface driver controller 1220 with one or more network interface cards 1222 connecting to one or more network devices 1224, memory 1270, and any other devices 1280, e.g., an I/O interface 1230. The network interface card 1222 may have one or more network interface driver ports to communicate with the connected devices or components. Generally, a processor 1250 will execute instructions received from memory. The processor 1250 illustrated incorporates, or is directly connected to, cache memory 1275.

In more detail, the processor 1250 may be any logic circuitry that processes instructions, e.g., instructions fetched from the memory 1270 or cache 1275. In many embodiments, the processor 1250 is a microprocessor unit or special purpose processor. The computing device 1200 may be based on any processor, or set of processors, capable of operating as described herein. The processor 1250 may be a single core or multi-core processor. The processor 1250 may be multiple processors. In some implementations, the processor 1250 can be configured to run multi-threaded operations. In some implementations, the processor 1250 may host one or more virtual machines or containers, along with a driver or container manager for managing the operation of the virtual machines or containers. In such implementations, the methods shown in FIGS. 3, 5, 7, 9, and 11 can be implemented at least partly within the network interface card 1222 in conjunction with the virtualized or containerized environments provided on the processor 1250.

The memory 1270 may be any device suitable for storing computer readable data. The memory 1270 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 1200 may have any number of memory devices 1270. In some implementations, the memory 1270 supports virtualized or containerized memory accessible by virtual machine or container execution environments provided by the computing system 1210.

The cache memory 1275 is generally a form of computer memory placed in close proximity to the processor 1250 for fast read times. In some implementations, the cache memory 1275 is part of, or on the same chip as, the processor 1250. In some implementations, there are multiple levels of cache 1275, e.g., L2 and L3 cache layers.

The network interface driver controller 1220 manages data exchanges via the network interface driver 1222 (also referred to as network interface driver ports). The network interface driver controller 1220 handles the physical and data link layers of the OSI model for network communication. In some implementations, some of the network interface driver controller's tasks are handled by the processor 1250. In some implementations, the network interface driver controller 1220 is part of the processor 1250. In some implementations, a computing system 1210 has multiple network interface driver controllers 1220. The network interface driver ports configured in the network interface card 1222 are connection points for physical network links. In some implementations, the network interface controller 1220 supports wireless network connections and an interface port associated with the network interface card 1222 is a wireless receiver/transmitter. Generally, a computing device 1210 exchanges data with other network devices 1224 via physical or wireless links that interface with network interface driver ports configured in the network interface card 1222. In some implementations, the network interface controller 1220 implements a network protocol such as Ethernet.

The other network devices 1224 are connected to the computing device 1210 via a network interface driver port included in the network interface card 1222. The other network devices 1224 may be peer computing devices, network devices, or any other computing device with network functionality. For example, a first network device 1224 may be a network device such as a hub, a bridge, a switch, or a router, connecting the computing device 1210 to a data network such as the Internet.

The other devices 1280 may include an I/O interface 1230, external serial device ports, and any additional co-processors. For example, a computing system 1210 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 1200 includes an additional device 1280 such as a coprocessor, e.g., a math co-processor can assist the processor 1250 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of tracking page state changes, the method comprising:
   receiving, at an input/output (I/O) device communicatively coupled to a host having a physical memory, a command from the host to monitor page state changes in a first page of the physical memory allocated to a process executing on the host;
   modifying, by the I/O device, data stored in a first portion of the first page based on a request;
   recording, by the I/O device, the modification to a bitmap by setting a bit in the bitmap that corresponds to a location of the data in the physical memory;
   storing, by the I/O device, the bit in a first buffer in a general purpose memory of the host;
   completing, by the I/O device subject to receiving an instruction from the host to initiate a migration pass, pending bitmap updates;
   swapping, by the host, the first buffer with a second buffer; and
   copying, by the host, the first portion of the first page indicated by the bitmap in the first buffer to a second portion of a second page of physical memory, wherein the second page of physical memory can be in the physical memory of the host, or in a second physical memory of a second host.

2. The method of claim 1, wherein the request includes an I/O virtual address indicating a location of the data in a virtual memory of the process, and modifying the data includes:
    translating the I/O virtual address to obtain a host physical address indicating a location of the data in the physical memory.

3. The method of claim 2, wherein translating the I/O virtual address comprises:
    looking up the I/O virtual address in a local cache of the I/O device; and
    based on a determination that no entry for the I/O virtual address is found in the local cache, retrieving a translation of the address from the host, adding an entry for the I/O virtual address to the local cache, and adding an entry for the I/O virtual address to an access log queue of the I/O device, wherein:
    recording the modifications to the bitmap comprises setting bits according to the entries in the access log queue.

4. The method of claim 1, wherein recording the modification comprises:
    detecting, using a live migration engine of the I/O device, the request, wherein the request is received from a client device;
    based on finding an entry for an I/O virtual address of the request in a lookup table of the live migration engine, calculating a bitmap position based on a host physical address in the entry; and
    queuing a bitmap write address based on the bitmap position for recording to the bitmap.

5. The method of claim 4, wherein the lookup table records two entries for each detected request: a first entry with a wide spacing and a second entry with a tight spacing, and wherein live migration engine calculates the bitmap position and queues the bitmap write address based on the second entry.

6. The method of claim 1, wherein the bitmap is stored in an I/O device memory and transferring the contents of the bitmap to the host comprises, for each bit of the bitmap:
    reading the bit;
    preparing to copy a physical memory region corresponding to the bit location; and
    clearing the bit.

7. The method of claim 1, wherein the bitmap is stored in a general purpose memory of the host and transferring the contents of the bitmap to the host comprises, for each bit of the bitmap:
    reading, by the host, the bit;
    preparing, by the host, to copy a physical memory region corresponding to the bit location; and
    clearing, by the host, the bit.

8. The method of claim 1, wherein recording the modification to a bitmap comprises:
    writing multiple bits to the bitmap with a single write operation.

9. The method of claim 1, wherein:
    the request includes an I/O virtual address indicating a location of the data in a virtual memory of the process; and
    recording the modification is performed subject to a determination that the I/O virtual address falls within a predetermined range of I/O virtual addresses designated for monitoring and migrating.

10. The method of claim 1, wherein the process is one of a virtual machine, a user space application, or a container.

11. A system for tracking page state changes, the system comprising:
    a host having a physical memory, a CPU executing a process, and a general purpose memory having a first buffer and a second buffer; and
    an input/output (I/O) device communicatively coupled to the host configured to:
    receive a command from the host to monitor page state changes in a first page of the physical memory allocated to the process;
    modify data stored in a first portion of the first page based on a request received;
    record the modification to a bitmap by setting a bit in the bitmap that corresponds to a location of the data in the physical memory;
    store the bit in a first buffer in a general purpose memory of the host;
    complete, subject to receiving an instruction from the host to initiate a migration pass, pending bitmap updates,
    wherein the host is configured to:
    swap the first buffer with the second buffer;
    copy the first portion of the first page indicated by the bitmap in the first buffer to a second portion of a second page of physical memory, wherein the second page of physical memory can be in the physical memory of the host, or in a second physical memory of a second host.

12. The system of claim 11, wherein:
    the request includes an I/O virtual address indicating a location of the data in a virtual memory of the process, and
    the I/O device modifies the data by translating the I/O virtual address to obtain a host physical address indicating a location of the data in the physical memory.

13. The system of claim 12, wherein the I/O device translates the I/O virtual address by:
    looking up the I/O virtual address in a local cache of the I/O device; and
    based on a determination that no entry for the I/O virtual address is found in the local cache, retrieving a translation of the address from the host, adding an entry for the I/O virtual address to the local cache, and adding an entry for the I/O virtual address to an access log queue of the I/O device, wherein:
    recording the modifications to the bitmap comprises setting bits according to the entries in the access log queue.

14. The system of claim 11, wherein the I/O device includes a live migration engine configured to record the modification by:
    detecting the request, wherein the request is received from a client device;
    based on finding an entry for an I/O virtual address of the request in a lookup table of the live migration engine, calculating a bitmap position based on a host physical address in the entry; and
    queuing a bitmap write address based on the bitmap position for recording to the bitmap.

15. The system of claim 14, wherein the lookup table is configured to record two entries for each detected request: a first entry with a wide spacing and a second entry with a tight spacing, and wherein live migration engine calculates the bitmap position and queues the bitmap write address based on the second entry.

16. The system of claim 11, wherein the I/O device is configured to store the bitmap in an I/O device memory, and the system is configured to transfer the contents of the bitmap to the host by, for each bit of the bitmap:

reading the bit;

preparing to copy a physical memory region corresponding to the bit location; and clearing the bit.

17. The system of claim 11, wherein the host includes a general purpose memory configured to store the bitmap, and the system is configured to transfer the contents of the bitmap to the host by, for each bit of the bitmap:

reading, by the host, the bit;

preparing, by the host, to copy a physical memory region corresponding to the bit location; and clearing, by the host, the bit.

18. The system of claim 11, wherein the I/O device is configured to record the modification to a bitmap by:

writing multiple bits to the bitmap with a single write operation.

19. The system of claim 11, wherein:

the request includes an I/O virtual address indicating a location of the data in a virtual memory of the process; and recording the modification is performed subject to a determination that the I/O virtual address falls within a predetermined range of I/O virtual addresses designated for monitoring and migrating.

20. The system of claim 11, wherein the process is one of a virtual machine, a user space application, or a container.

* * * * *